US010530470B2

(12) United States Patent
Takigawa

(10) Patent No.: US 10,530,470 B2
(45) Date of Patent: Jan. 7, 2020

(54) OPTICAL ADD/DROP DEVICE AND OPTICAL ADD/DROP METHOD

(71) Applicant: NEC Corporation, Tokyo (JP)

(72) Inventor: Yoshinari Takigawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 15/746,279

(22) PCT Filed: Aug. 1, 2016

(86) PCT No.: PCT/JP2016/003532
§ 371 (c)(1),
(2) Date: Jan. 19, 2018

(87) PCT Pub. No.: WO2017/022231
PCT Pub. Date: Feb. 9, 2017

(65) Prior Publication Data
US 2018/0219619 A1  Aug. 2, 2018

(30) Foreign Application Priority Data
Aug. 3, 2015  (JP) .................... 2015-153538

(51) Int. Cl.
H04B 10/00  (2013.01)
H04J 14/00  (2006.01)
(Continued)

(52) U.S. Cl.
CPC .......... *H04B 10/032* (2013.01); *H04B 10/03* (2013.01); *H04B 10/25* (2013.01); *H04B 10/27* (2013.01);
(Continued)

(58) Field of Classification Search
USPC .............. 398/52, 140, 155, 48, 83
See application file for complete search history.

(56) References Cited

U.S. PATENT DOCUMENTS 6,211,980 B1* 4/2001 Terahara ............. H04J 14/0209
385/16
6,778,725 B1  8/2004 Kakizaki et al.
(Continued)

FOREIGN PATENT DOCUMENTS

CN  102959883 A  3/2013
CN  103155461 A  6/2013
(Continued)

OTHER PUBLICATIONS

Simmons, Jane M., et al., "Analysis of Internal ROADM Protection", 2015 36th IEEE Sarnoff Symposium, U.S.A., IEEE, Sep. 20, 2015, pp. 66-69 (4 pages).
(Continued)

Primary Examiner — David C Payne
Assistant Examiner — Pranesh K Barua
(74) Attorney, Agent, or Firm — Wilmer Cutler Pickering Hale and Dorr LLP

(57) ABSTRACT

In order to improve the reliability of a reconfigurable optical add/drop multiplexing (ROADM) device, provided is an optical add/drop device that comprises the following: a first wavelength selection unit and a second wavelength selection unit that can select and output an optical signal of a prescribed wavelength from among inputted optical signals; a first branching unit that selectively outputs a first signal being an optical signal that has been inputted from a first terminal station on a main route to the first wavelength selection unit and the second wavelength selection unit; a second branching unit that selectively outputs a second signal being an optical signal that has been inputted from a second terminal station on a sub-route to the first wavelength selection unit and the second wavelength selection unit; and a first output unit that can selectively output to the second terminal station, as a third signal, either the optical signal (Continued)

outputted by the first wavelength selection unit on the basis of the first signal and the second signal, or the optical signal outputted by the second wavelength selection unit on the basis of the first signal and the second signal.

14 Claims, 15 Drawing Sheets

(51) Int. Cl.
*H04J 14/02* (2006.01)
*H04B 10/032* (2013.01)
*H04B 10/27* (2013.01)
*H04B 10/03* (2013.01)
*H04B 10/25* (2013.01)
*H04Q 11/00* (2006.01)

(52) U.S. Cl.
CPC .............. *H04J 14/00* (2013.01); *H04J 14/02* (2013.01); *H04J 14/0201* (2013.01); *H04Q 11/0005* (2013.01)

(56) References Cited

U.S. PATENT DOCUMENTS

| | | | | |
|---|---|---|---|---|
| 2002/0064336 | A1* | 5/2002 | Graves | H04J 14/0293 385/17 |
| 2002/0191899 | A1* | 12/2002 | Kelly | H04J 14/0209 385/24 |
| 2004/0081460 | A1 | 4/2004 | Kakizaki et al. | |
| 2005/0031346 | A1* | 2/2005 | Kakizaki | H04B 10/00 398/45 |
| 2006/0034610 | A1* | 2/2006 | Akiyama | H04J 14/0204 398/83 |
| 2007/0003283 | A1* | 1/2007 | Feuer | H04B 10/2503 398/83 |
| 2007/0269211 | A1* | 11/2007 | Doerr | H04J 14/0209 398/49 |
| 2009/0324243 | A1* | 12/2009 | Neilson | H04Q 11/0005 398/154 |
| 2010/0034532 | A1* | 2/2010 | Ghelfi | H04J 14/0204 398/2 |
| 2011/0076016 | A1* | 3/2011 | Wisseman | H04J 14/0204 398/48 |
| 2012/0087658 | A1* | 4/2012 | Jander | H04J 14/02 398/48 |
| 2012/0121267 | A1* | 5/2012 | Wang | H04J 14/0201 398/83 |
| 2012/0243879 | A1 | 9/2012 | Nashimoto et al. | |
| 2012/0328297 | A1* | 12/2012 | Hoshida | H04J 14/02 398/85 |
| 2013/0045010 | A1* | 2/2013 | Mukai | H04B 10/07 398/52 |
| 2013/0259475 | A1* | 10/2013 | Ji | H04Q 11/0005 398/48 |
| 2014/0099098 | A1* | 4/2014 | Wang | H04J 14/0201 398/7 |
| 2015/0086192 | A1 | 3/2015 | Sakamoto | |
| 2015/0200743 | A1* | 7/2015 | Kamalov | H04J 14/0202 398/85 |
| 2016/0056887 | A1* | 2/2016 | Shimizu | H04J 3/14 398/5 |

FOREIGN PATENT DOCUMENTS

| | | |
|---|---|---|
| CN | 103748818 A | 4/2014 |
| CN | 104753624 A | 7/2015 |
| EP | 1487138 B1 | 6/2006 |
| JP | 2006-140598 A | 6/2006 |
| JP | 2011-109173 A | 6/2011 |
| WO | WO-2013/183146 A1 | 12/2013 |

OTHER PUBLICATIONS

Yuzo Ishii, et al., "WSS Module Art Having Advanced Features of ROADM", NTT Technical Journal, Japan, NIPPON Telegraph and Telephone Corporation Nov. 2013, vol. 25, No. 11, pp. 21-24 (4 pages). downloaded from website http://www.ntt.co.jp/journal/1311/files/jn201311021.pdf.

Japanese Decision to Grant a Patent issued in Japanese Patent Application No. 2017-532376, dated Feb. 5, 2019, 5 pages.

Simmons M. Jane et al, Analysis of Internal ROADM Protection, 2015 36th IEEE Sarnoff Symposium, Sep. 21, 2015, pp. 1-4.

Yuzo Ishii, et al., WSS Module Technique for high-functionalizing ROADM, NTT Technical Journal, vol. 25, No. 11, Nippon Telegraph and Telephone Corporation [online], Nov. 2013, pp. 21 to 24, [date of search: Aug. 12, 2016], Internet <URL:http://www.ntt.co.jp/journal/1311/files/jn201311021.pdf>.

International Search Report corresponding to PCT/JP2016/003532, dated Aug. 23, 2016, 1 page.

Extended European Search Report issued by the European Patent Office for European Application No. 16832514.0 dated Jul. 11, 2018 (7 pages).

Chinese First Office Action issued in Chinese Patent Application No. 201680046019.7, dated Sep. 3, 2019, 19 pages.

* cited by examiner

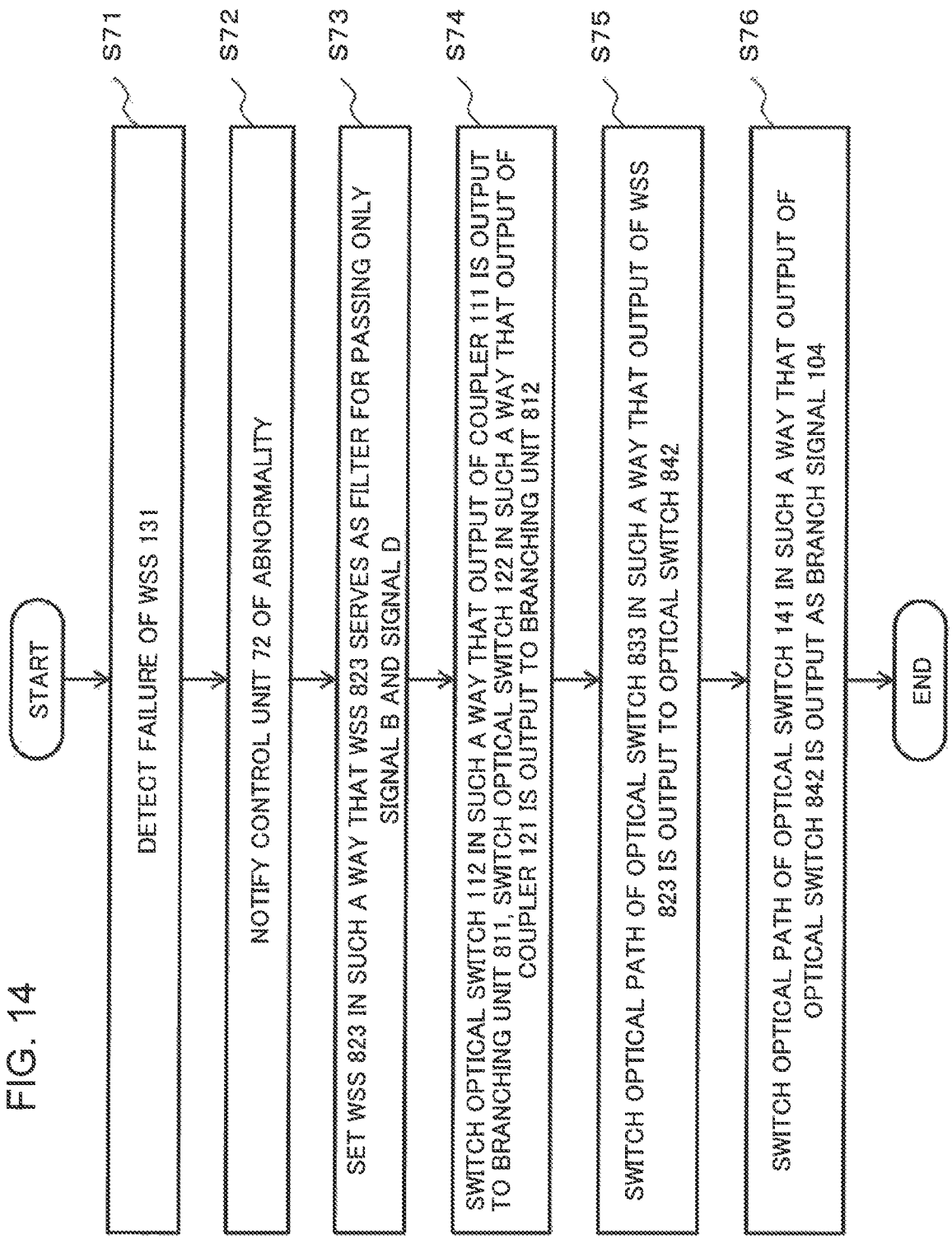

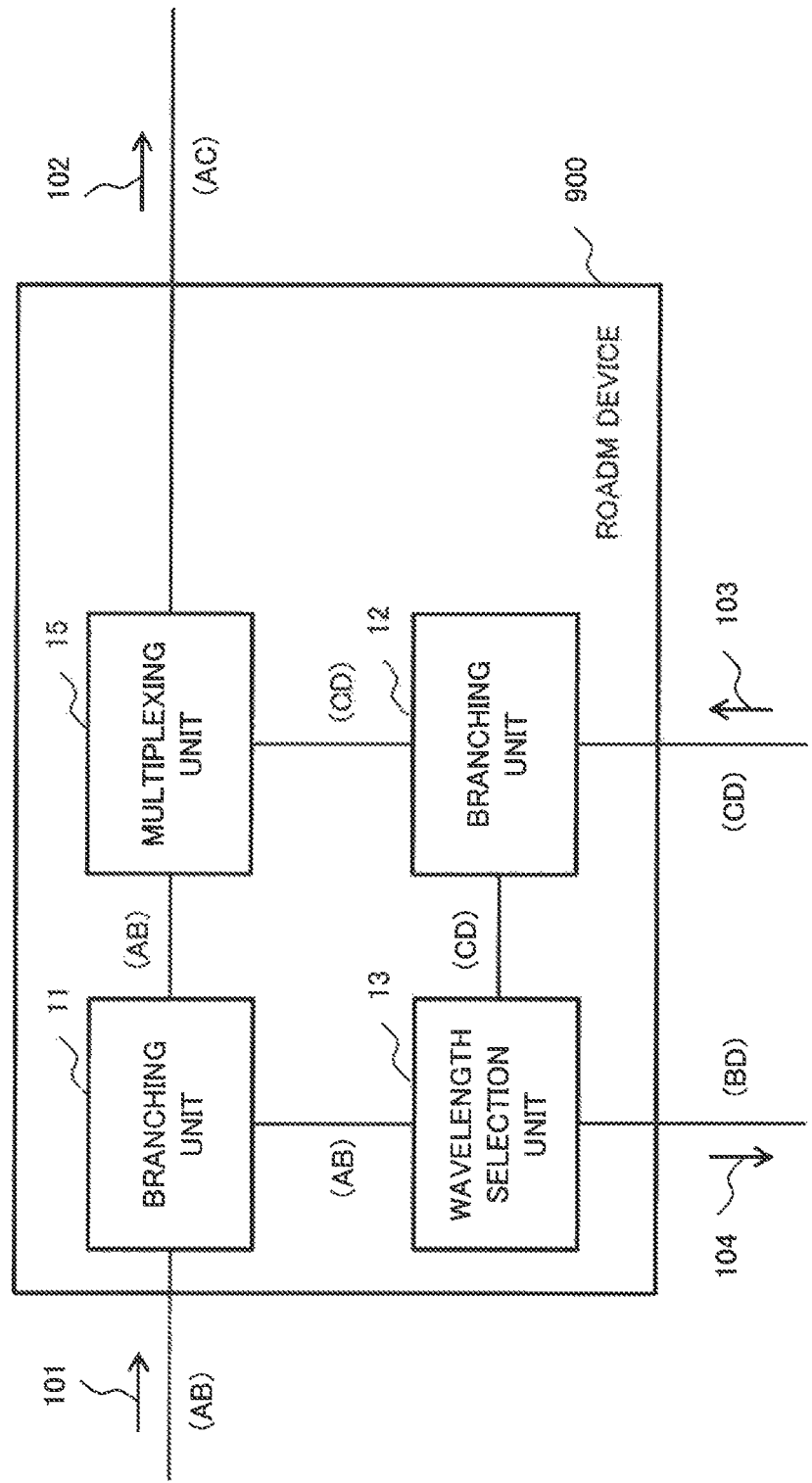

OPTICAL ADD/DROP DEVICE AND OPTICAL ADD/DROP METHOD

CROSS-REFERENCE TO RELATED APPLICATIONS

This application is a national stage application of International Application No. PCT/JP2016/003532 entitled "OPTICAL ADD/DROP DEVICE AND OPTICAL ADD/DROP METHOD," filed on Aug. 1, 2016, which claims the benefit of the priority of Japanese Patent Application No. 2015-153538 filed on Aug. 3, 2015, the disclosures of each of which are hereby incorporated by reference in their entirety.

TECHNICAL FIELD

The present invention relates to an optical add/drop device and an optical add/drop method, particularly, to an optical add/drop device and an optical add/drop method including a configuration for enhancing reliability of the optical add/drop device.

BACKGROUND ART

In recent years, application of a reconfigurable optical add drop multiplexing (ROADM) device to a submarine cable system has been considered. The ROADM device is able to re-configure connection between lines after an operation is started. Functions of the ROADM device are implemented by a wavelength selective switch (hereinafter, referred to as "WSS") having a demultiplexing function, a switching function, and a multiplexing function.

FIG. 15 is a block diagram illustrating a configuration of a general ROADM device 900. The ROADM device 900 includes branching units 11 and 12, a wavelength selection unit 13, and a multiplexing unit 15. A trunk signal 101 and a branch signal 103 are input to the ROADM device 900. The ROADM device 900 generates and outputs a trunk signal 102 and a branch signal 104 from an optical signal included in the trunk signal 101 and the branch signal 103.

The trunk signal 101 is a signal obtained by wavelength-multiplexing an optical signal of a wavelength band A and an optical signal of a wavelength band B. The branch signal 103 is a signal obtained by wavelength-multiplexing an optical signal of a wavelength band C and an optical signal of a wavelength band D. In the following description, each of the optical signals is described by using a wavelength band of the optical signal. For example, an optical signal of the wavelength A is described as a signal A, and an optical signal obtained by wavelength-multiplexing an optical signal of the wavelength band A and an optical signal of the wavelength band B is described as a signal AB. Therefore, the trunk signal 101 may be described as the signal AB, and the branch signal 103 may be described as a signal CD. Further, in the drawings, the signal AB and the signal CD are described as "(AB)" and "(CD)". The same definition is also applied to signals of other wavelength bands. Note that in the present application, arrows in the drawings indicate only propagation directions of signals associated with description, and do not limit propagation directions of other signals.

The signal D is a dummy signal for use in the branch signals 103 and 104. The signal D is transmitted in order to set a total optical power of a transmission path on the branch side within a fixed range. The signal D does not have to carry information to be transmitted. By using the signal D, it is possible to share a specification of an optical repeater amplifier for use in a submarine cable system.

The branching unit 11 branches the input trunk signal 101 (signal AB) into two signals, and outputs the two signals to the wavelength selection unit 13 and the multiplexing unit 15. The branching unit 12 branches the input branch signal 103 (signal CD) into two signals, and outputs the two signals to the wavelength selection unit 13 and the multiplexing unit 15. A WSS is used in the wavelength selection unit 13. The multiplexing unit 15 outputs the trunk signal 102 (signal AC) from the signal AB and the signal CD. The wavelength section unit 13 outputs the branch signal 104 (signal BD) from the signal AB and the signal CD.

In association with the present invention, PTLs 1 and 2 describe an optical cross-connect device using a WSS.

CITATION LIST

Patent Literature

[PTL 1] Japanese Laid-open Patent Publication No. 2006-140598 (paragraphs [0041] to [0046])
[PTL 2] Japanese Laid-open Patent Publication No. 2011-109173 (paragraphs [0017] to [0018])

SUMMARY OF INVENTION

Technical Problem

A general WSS is able to select optical signals of a specific wavelength band from among input wavelength multiplexed optical signals, and wavelength-multiplex the selected optical signals of the wavelength band and output the wavelength-multiplexed optical signal. A wavelength to be selected and output by a WSS is settable from outside of the WSS by using a control signal. A WSS having such a function has a complicated structure, and a failure rate is high, as compared with an optical filter having a wavelength to be selected being fixed. On the other hand, functions of an ROADM device greatly depend on a WSS. A failure of one WSS may adversely affect functions of the entire ROADM device. However, a large cost is required in order to raise an ROADM device installed in the bottom of the sea for repair. Further, it is not possible to use a route via an ROADM device during repair of the ROADM device. This may affect an operation of a submarine cable system.

In view of the above, design having a high reliability against a failure of a WSS is required for an ROADM device including the WSS. On the other hand, PTLs 1 and 2 fail to describe a configuration for enhancing reliability of an ROADM device against a failure of a WSS in a device using the WSS.

Object of Invention

An object of the present invention is to provide a technique for enhancing reliability of an ROADM device.

Solution to Problem

An optical add/drop device according to the present invention includes: a first wavelength selection means and a second wavelength selection means capable of selecting and outputting an optical signal of a predetermined wavelength from an input optical signal; a first branching means for selectively outputting a first signal being an optical signal input from a first terminal station on a main route to the first wavelength selection means and the second wavelength selection means; a second branching means for selectively outputting a second signal being an optical signal input from a second terminal station on a sub-route to the first wavelength selection means and the second wavelength selection means; and a first output means capable of selectively outputting, to the second terminal station, one of an optical signal to be output from the first wavelength selection means, based on the first signal and the second signal, and an optical signal to be output from the second wavelength selection means, based on the first signal and the second signal, as a third signal.

An optical add/drop method according to the present invention includes: selecting and outputting an optical signal of a predetermined wavelength from an input optical signal by a first wavelength selection means; selecting and outputting an optical signal of a predetermined wavelength from an input optical signal by a second wavelength selection means; selectively outputting a first signal being an optical signal input from a first terminal station on a main route to the first wavelength selection means and the second wavelength selection means; selectively outputting a second signal being an optical signal input from a second terminal station on a sub-route to the first wavelength selection means and the second wavelength selection means; and selectively outputting, to the second terminal station, one of an optical signal to be output from the first wavelength selection means, based on the first signal and the second signal, and an optical signal to be output from the second wavelength selection means, based on the first signal and the second signal, as a third signal.

Advantageous Effects of Invention

The present invention provides an advantageous effect that reliability of an optical add/drop device is enhanced.

BRIEF DESCRIPTION OF DRAWINGS

FIG. 14 is a flowchart illustrating an example of a process of allowing a WSS 823 to substitute for a function of a WSS 131 when a failure occurs in the WSS 131.

FIG. 15 is a block diagram illustrating a configuration of a general ROADM device 900.

DESCRIPTION OF EMBODIMENTS

First Example Embodiment

Figure 1:
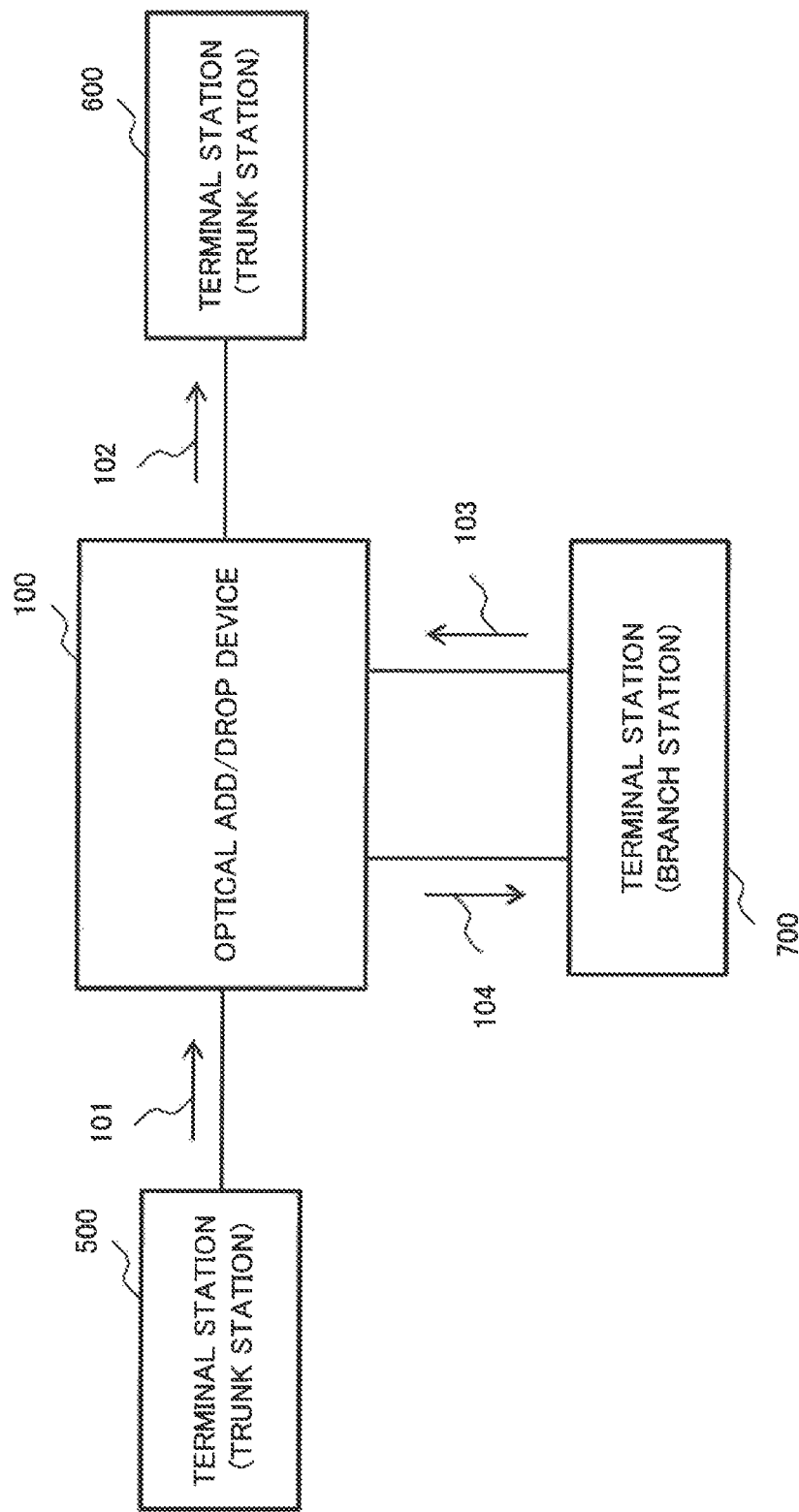
FIG. 1 is a block diagram illustrating a configuration of an submarine cable system 1.

FIG. 1 is a block diagram illustrating a configuration of a submarine cable system 1 in the first example embodiment of the present invention. The submarine cable system 1 includes an optical add/drop device 100, terminal stations 500 and 600 (trunk stations), and a terminal station 700 (branch station). The terminal stations 500, 600, and 700 are communication devices installed on the land, and terminate an optical submarine cable. The optical add/drop device 100 in the present example embodiment is a reconfigurable optical add/drop multiplexing (ROADM) device to which a plurality of optical submarine cables are connected. The optical add/drop device 100 is installed in the bottom of the sea, and relays optical communication between the terminal stations 500, 600, and 700. An optical repeater amplifier is installed as necessary at a midway of a submarine cable for connecting the optical add/drop device 100 and the terminal stations 500, 600, and 700.

A trunk signal 101 is input from the terminal station 500 to the optical add/drop device 100, and a branch signal 103 is input from the terminal station 700 to the optical add/drop device 100. Each of the trunk signal 101 and the branch signal 103 is a wavelength-multiplexed signal including an optical signal of at least one wavelength band. The optical add/drop device 100 selects an optical signal of a predetermined wavelength band from the trunk signal 101 and the branch signal 103, and generates a trunk signal 102 based on the selected optical signal. The trunk signal 102 is transmitted from the optical add/drop device 100 to the terminal station 600. Further, the optical add/drop device 100 selects an optical signal of a predetermined wavelength band from the trunk signal 101 and the branch signal 103, and generates a branch signal 104 based on the selected optical signal. The branch signal 104 is transmitted from the optical add/drop device 100 to the terminal station 700.

A line between the terminal station 500 and the optical add/drop device 100, and between the optical add/drop device 100 and the terminal station 600 is also referred to as a trunk line. The trunk line is a main route of the submarine cable system 1. A line between the terminal station 700 and the optical add/drop device 100 is also referred to as a branch line. The branch line is a sub-route of the submarine cable system 1. For example, a branch line is used for allowing the terminal station 700 to transmit and receive a part of an optical signal propagating through a trunk line.

Figure 2:
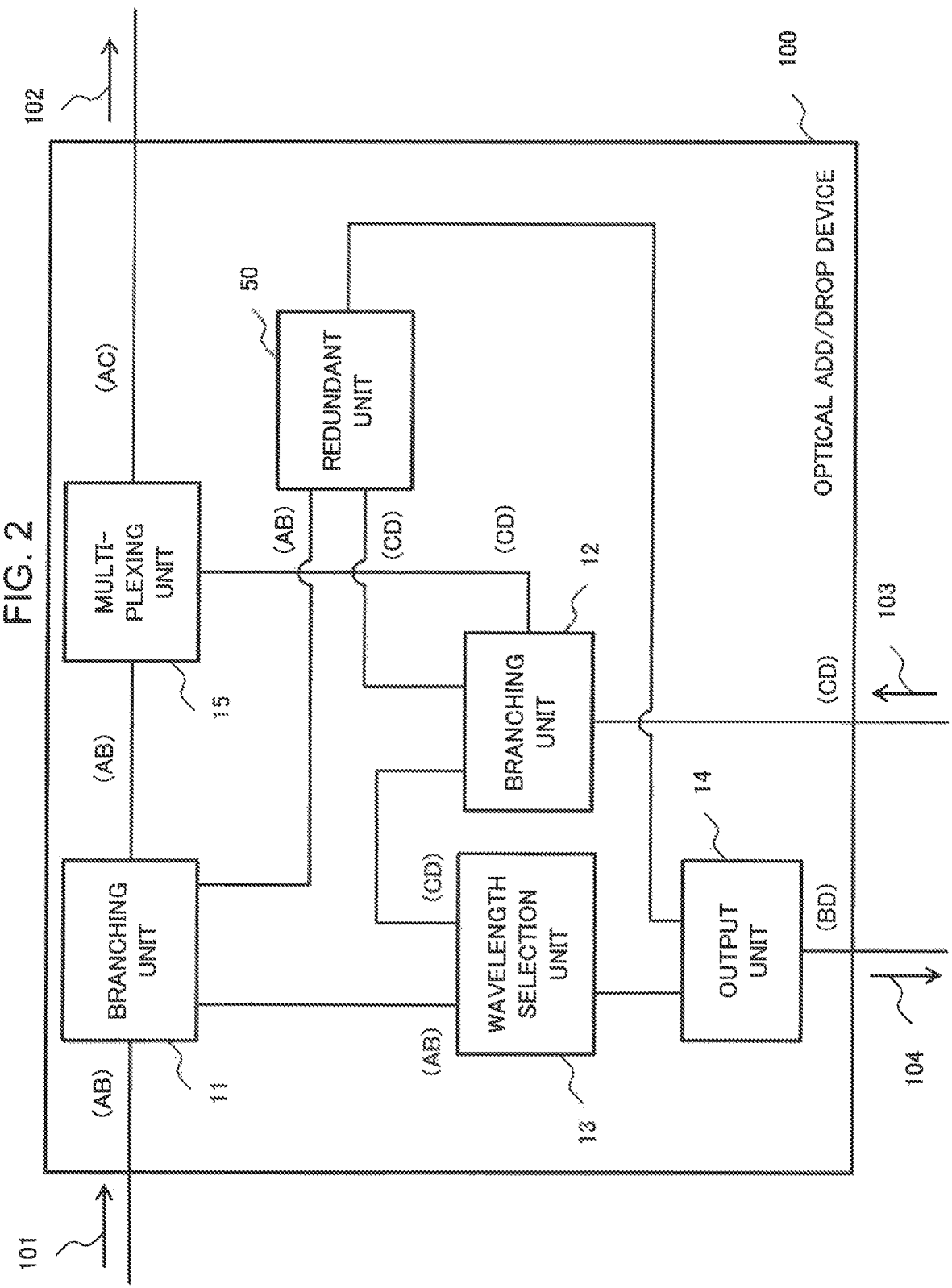
FIG. 2 is an example of a block diagram of an optical add/drop device 100.

FIG. 2 is an example of a block diagram of the optical add/drop device 100 for use in the submarine cable system 1. The optical add/drop device 100 includes branching units 11 and 12, a wavelength selection unit 13, an output unit 14, a multiplexing unit 15, and a redundant unit 50.

In the present example embodiment, the trunk signal 101 is a signal AB obtained by wavelength-multiplexing an optical signal of a wavelength band A (signal A) and an optical signal of a wavelength band B (signal B). The branch signal 103 is a signal CD obtained by wavelength-multiplexing an optical signal of a wavelength band C (signal C) and an optical signal of a wavelength band D (signal D). In the following example embodiments, it is assumed that wavelength bands do not overlap between optical signals to be wavelength-multiplexed.

The signals A to C are optical signals to be transmitted from a certain terminal station to another terminal station via the optical add/drop device 100. The signal A is input to the optical add/drop device 100 while being included in the trunk signal 101, and is output from the optical add/drop device 100 while being included in the trunk signal 102. The signal B is input while being included in the trunk signal 101, and is output while being included in the branch signal 104. The signal C is input while being included in the branch signal 103, and is output while being included in the trunk signal 102.

The signal D of the wavelength band D is a dummy signal for use in the branch signals 103 and 104. The signal D is transmitted in order to set a total optical power of a transmission path on the branch side within a fixed range. The signal D does not have to carry information to be transmitted. By using the signal D, it is possible to share specifications of optical repeater amplifiers for use in the submarine cable system 1.

The branching unit 11 branches the trunk signal 101 (signal AB) input from the terminal station 500. The signal AB branched by the branching unit 11 is output to one of the redundant unit 50 and the wavelength selection unit 13, and to the multiplexing unit 15. The branching unit 12 branches the input branch signal 103 (signal CD). The signal CD branched by the branching unit 12 is output to one of the redundant unit 50 and the wavelength selection unit 13, and to the multiplexing unit 15.

The wavelength selection unit 13 is configured in such a way that the signal AB output from the branching unit 11 and the signal CD output from the branching unit 12 are input. When the signal AB and the signal CD are input, the wavelength selection unit 13 selects only signals of the wavelength bands B and D, and generates a signal BD.

The signal BD to be output from the wavelength selection unit 13, and a signal to be output from the redundant unit 50 are input to the output unit 14. As will be described later, the redundant unit 50 is able to output the signal BD to the output unit 14. The output unit 14 selects only one of the input signals, and outputs the selected signal to the terminal station 700 as the branch signal 104.

The multiplexing unit 15 selects signals of the wavelength bands A and C from the signal AB input from the branching unit 11 and the signal CD input from the branching unit 12, and generates a signal AC. The multiplexing unit 15 outputs the generated signal AC to the terminal station 600 as the trunk signal 102.

The redundant unit 50 monitors an operation of each unit of the optical add/drop device 100, and sets an operation of each unit. When a failure such as abnormality of a wavelength selection function of the wavelength selection unit 13 is detected, the redundant unit 50 controls the branching units 11 and 12, the output unit 14, and the redundant unit 50 in such a way that the redundant unit 50 substitutes for a function of the wavelength selection unit 13. Note that a line indicating a signal for controlling each unit by the redundant unit 50 is omitted in FIG. 2. Further, a monitor function and a control function of the optical add/drop device 100 included in the redundant unit 50 may be disposed on the outside of the redundant unit 50.

Since the redundant unit 50 has a function of substituting for the wavelength selection unit 13, even when a failure occurs in the wavelength selection unit 13, the optical add/drop device 100 is able to transmit the branch signal 104 to the terminal station 700. Consequently, the optical add/drop device 100 provides an advantageous effect that reliability of the optical add/drop device 100 and the submarine cable system 1 to which the optical add/drop device 100 is connected is enhanced.

Figure 3:
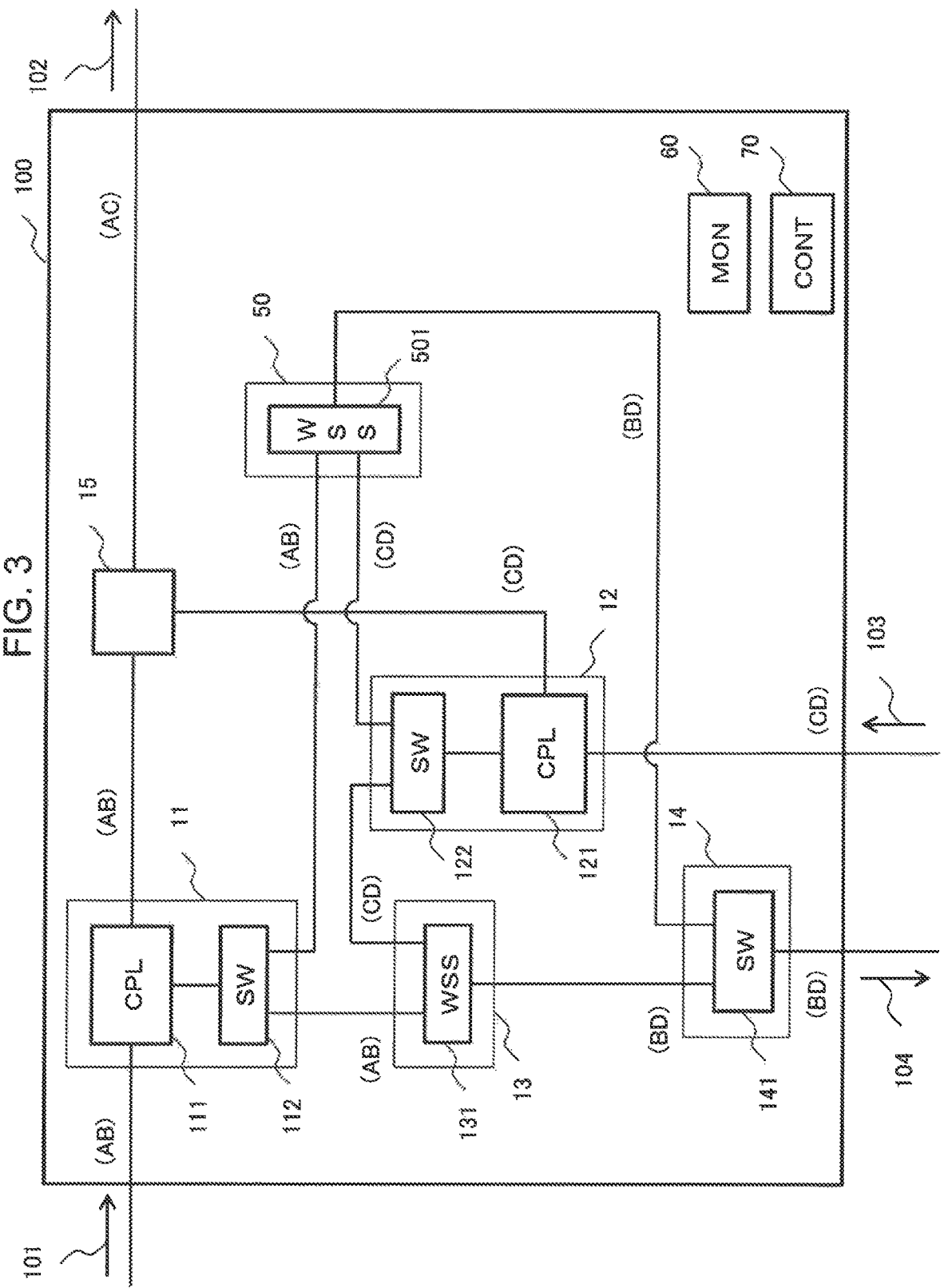
FIG. 3 is an example of a block diagram illustrating a detailed configuration of the optical add/drop device 100.

A more specific configuration and a more specific operation of the optical add/drop device 100 are described. FIG. 3 is an example of a block diagram illustrating a detailed configuration of the optical add/drop device 100 described in FIG. 2. The branching unit 11 includes a coupler (CPL) 111 and a switch (SW) 112. The branching unit 12 includes a coupler 121 and a switch 122. The wavelength selection unit 13 includes a wavelength selective switch (WSS) 131, and the redundant unit 50 includes a WSS 501. The output unit 14 includes a switch 141. Further, FIG. 3 illustrates a monitor function and a control function included in the redundant unit 50 in FIG. 2 on the outside of the redundant unit 50, as a monitor unit (MON) 60 and a control unit (CONT) 70, respectively.

Each of the couplers 111 and 121 branches input light into two components. Each of the couplers 111 and 121 is, for example, a 1×2 optical directional coupler having a branching ratio of 1:1. Each of the switches 112 and 122 is an optical switch having one input and two outputs. The switch 112 outputs the signal AB branched by the coupler 111 to one of the wavelength selection unit 13 and the redundant unit 50. The switch 122 outputs the signal CD branched by the coupler 121 to one of the wavelength selection unit 13 and the redundant unit 50. The switches 112 and 122 are controlled by the control unit 70.

Each of the WSSs 131 and 501 selects an optical signal of one or more wavelengths from among input optical signals, and outputs light of the selected wavelength as a wavelength-multiplexed optical signal. Wavelengths of optical signals to be generated by the WSSs 131 and 501 are set by the control unit 70. In the present example embodiment, when the signal AB is input from the switch 112 and the signal CD is input from the switch 122, the WSS 131 generates the signal BD and outputs the signal BD to the switch 141. Likewise, when the signal AB is input from the switch 112 and the signal CD is input from the switch 122, the WSS 501 generates the signal BD and outputs the signal BD to the switch 141.

The switch 141 selects one of a signal to be input from the WSS 131 and a signal to be input from the WSS 501, and outputs the selected signal as the branch signal 104.

The monitor unit 60 monitors the WSSs 131 and 501. When a failure of the WSS 131 is detected, the monitor unit 60 notifies the control unit 70 of the detection information as a monitoring result. A process of detecting a failure of the WSS 131 is not limited. For example, when the WSS 131 has a function of monitoring optical power of an inner optical path, and an optical signal is not detected in a predetermined path, the WSS 131 may notify the monitor unit 60 of a signal indicating a failure. A monitoring result by the monitor unit 60 may be notified to one of the terminal stations coupled with the optical add/drop device 100, in addition to the control unit 70. The control unit 70 controls the entirety of the optical add/drop device 100 including the WSSs 131 and 501, and the switches 112, 122, and 141. The control unit 70 controls wavelengths to be selected and output from the WSSs 131 and 501, and the switches 112, 122, and 141, based on a monitoring result to be notified from the monitor unit 60 or a terminal station, or based on a command from a terminal station. Notification on a monitoring result by the monitor unit 60, and control by the control unit 70 may be performed by an unillustrated electrical circuit.

The control unit 70 may include a central processing unit (CPU) and a storage device. The storage device is a fixed non-transitory storage medium, and may be a non-volatile semiconductor memory, for example. The storage device, however, is not limited to the above. The CPU may implement functions of the optical add/drop device 100 by executing a program stored in the storage device.

Referring to FIG. 3, control of the optical add/drop device 100 and a propagation path of an optical signal are described. When the WSS 131 is operating properly, the control unit 70 controls the switch 112 in such a way that the coupler 111 and the WSS 131 are connected, and controls the switch 122 in such a way that the coupler 121 and the WSS 131 are connected. Further, when the WSS 131 is operating properly, the control unit 70 controls the switch 141 in such a way that an optical signal to be output from the WSS 131 is output as the branch signal 104.

The WSS 131 generates the signal BD from the signal AB output from the switch 112 and the signal CD output from the switch 122, and outputs the signal BD to the switch 141. The multiplexing unit 15 generates the signal AC from the signal AB output from the coupler 111 and the signal CD output from the coupler 121, and outputs the signal AC.

The WSS 501 included in the redundant unit 50 is a stand-by WSS, and is used as a substitute for the WSS 131 when the WSS 131 fails. Specifically, the WSS 501 generates the signal BD from the signal AB output from the switch 112 and the signal CD output from the switch 122, and outputs the signal BD to the switch 141. The control unit 70 controls in such a way that both outputs from the switches 112 and 122 are connected to the WSS 131, or connected to the WSS 501.

Operation Example of First Example Embodiment

Figure 4:
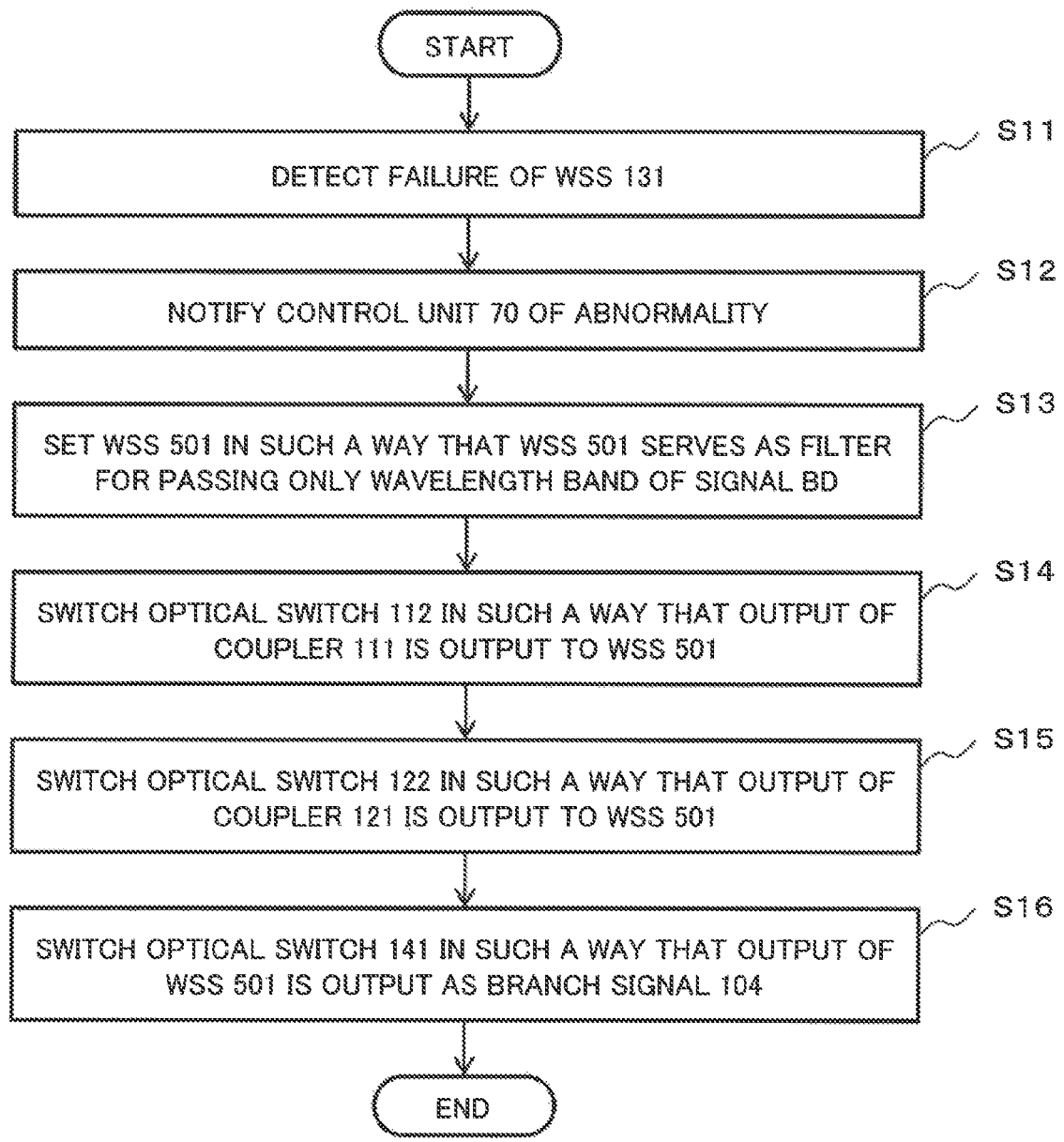
FIG. 4 is a flowchart illustrating an operation example of the optical add/drop device 100 when a failure occurs in a WSS 131.

FIG. 4 is a flowchart illustrating an operation example of the optical add/drop device 100 when the WSS 131 fails. When the WSS 131 fails, the WSS 501 outputs the signal BD in place of the WSS 131. When abnormality of the WSS 131 is detected (Step S11 in FIG. 4), the monitor unit 60 notifies the control unit 70 of the abnormality (Step S12). The monitor unit 60 may notify one of the terminal stations 500, 600, and 700 of the abnormality. The control unit 70 may control the switches 112, 122, and 141, and the WSS 501, based on a command from one of the terminal stations 500, 600, and 700 which receives notification on the abnormality.

The control unit 70 controls the switches 112, 122, and 141, and the WSS 501 as follows, based on a notification from the monitor unit 60. The control unit 70 sets the WSS 501 in such a way that the WSS 501 serves as a filter for passing only a wavelength band of the signal BD (Step S13). The control unit 70 switches the switch 112 in such a way that the signal AB output from the coupler 111 is output to the WSS 501 (Step S14). The control unit 70 switches the switch 122 in such a way that the signal CD output from the coupler 121 is output to the WSS 501 (Step S15). By processes of Steps S13 to S15, the signal BD is output from the WSS 501.

The control unit 70 switches the switch 141 in such a way that the signal BD input from the WSS 501 is output as the branch signal 104 (Step S16).

By the aforementioned processes, the WSS 501 performs filtering with respect to the signal AB input from the branching unit 11 and the signal CD input from the branching unit 12, and generates the signal BD. The generated signal BD is output from the output unit 14 to the outside of the optical add/drop device 100 as the branch signal 104. Consequently, the optical add/drop device 100 is able to output the branch signal 104 even when a failure occurs in the WSS 131. Note that the process of FIG. 4 is provided for the purpose of outputting the signal BD generated in the WSS 501 as the branch signal 104. Therefore, the order of executing processes of Steps S13 to S16 is not limited to the order of the flowchart illustrated in FIG. 4.

Description on Advantageous Effects of First Example Embodiment

The optical add/drop device 100 is able to output the branch signal 104 even when a failure of the WSS 131 occurs by providing the redundant unit 50 for substituting for a function of the WSS 131 included in the wavelength selection unit 13. Specifically, the optical add/drop device 100 provides an advantageous effect that reliability of the optical add/drop device 100 is enhanced.

By enhancing reliability of the optical add/drop device 100, when the optical add/drop device 100 is installed in the bottom of the sea, frequency of occurrence of a failure which requires raising the optical add/drop device 100 is lowered. Consequently, it is possible to suppress the repair cost of the optical add/drop device 100, and to enhance reliability of a network with which the optical add/drop device 100 is coupled.

Modification Example of First Example Embodiment

In the first example embodiment, it is possible to replace the switch 112 with an optical coupler (e.g. 1×2 optical directional coupler). By replacing the switch 112 with an optical coupler, the signal AB to be output from the coupler 111 is distributed to both the WSSs 131 and 501. Herein, the switch 141 is connected to one of the WSS 131 and the WSS 501. Therefore, also in this case, the signal BD from one of the WSS 131 and the WSS 501 is output from the switch 141 regardless of whether the WSS 131 is operating properly or the WSS 131 has failed. Therefore, same advantageous effects as those in the configuration illustrated in FIG. 3 are obtained even when the switch 112 is replaced with an optical coupler. Likewise, the switch 122 may be replaced with an optical coupler. Further, both of the switches 112 and 122 may be replaced with optical couplers, respectively. An optical coupler does not require control by the control unit 70. Therefore, by replacing a switch with an optical coupler, a configuration of the optical add/drop device 100 is simplified, and reliability of the optical add/drop device 100 and the submarine cable system 1 is further enhanced.

On the other hand, it is also possible to replace only the switch 141 with an optical coupler (e.g. a 2×1 optical directional coupler) while not replacing the switches 112 and 122. By functions of the switches 112 and 122, the signal AB and the signal CD are input only to a WSS (specifically, one of the WSSs 131 and 501) for generating the signal BD. Consequently, the WSSs 131 and 501 do not output a signal simultaneously. Therefore, even when only the switch 141 is replaced with a coupler, the output unit 14 is able to output the signal BD generated by one of the WSSs 131 and 501 as the branch signal 104. By replacing the switch 141 with an optical coupler, the switch 141 and control thereof are not required. Therefore, a configuration of the optical add/drop device 100 is simplified, and reliability of the optical add/drop device 100 and the submarine cable system 1 is further enhanced.

Specifically, in the modification example of the first example embodiment, by replacing an optical switch with an optical coupler, a configuration of the optical add/drop device 100 is simplified, and reliability of the optical add/drop device 100 and a network is enhanced.

Minimum Configuration of First Example Embodiment

Advantageous effects of the optical add/drop device 100 in the first example embodiment are also obtained by the following minimum configuration. In the following description on a minimum configuration, associated element names and associated reference numerals in FIG. 1 and FIG. 2 are indicated within brackets.

An optical add/drop device of a minimum configuration includes a first branching means (branching unit 11), a second branching means (branching unit 12), a first wavelength selection means (wavelength selection unit 13), a second wavelength selection means (redundant unit 50), and a first output means (output unit 14).

The first and second wavelength selection means (13, 50) are able to select an optical signal of a predetermined wavelength from an input optical signal (101), and output the optical signal. The first branching means (11) selectively outputs a first signal (101) being an optical signal input from a first terminal station (terminal station 500) on a main route to the first wavelength selection means (13) and the second wavelength selection means (50). The second branching means (12) selectively outputs a second signal (103) being an optical signal input from a second terminal station (terminal station 700) on a sub-route to the first wavelength selection means (13) and the second wavelength selection means (50).

The first output means (14) is able to selectively output, to the second terminal station (700), one of an optical signal to be output from the first wavelength selection means (13) based on the first signal (101) and the second signal (103), and an optical signal to be output from the second wavelength selection means (50) based on the first signal (101) and the second signal (103) as a third signal (104).

The optical add/drop device of a minimum configuration having such a configuration is able to output the third signal 104 even when a failure occurs in the first wavelength selection means by providing a second wavelength selection means which substitutes for a function of the first wavelength selection means. Specifically, the optical add/drop device of a minimum configuration also provides an advantageous effect that reliability of the optical add/drop device is enhanced.

Second Example Embodiment

A submarine cable system 2 in the second example embodiment of the present invention is described. The submarine cable system 2 is different from the submarine cable system 1 in the first example embodiment in a point that, further, an optical signal is transmitted from a terminal station 600 to terminal stations 500 and 700, and an optical signal is transmitted from the terminal station 700 to the terminal station 500. In description of the present example embodiment, elements having same functions as those in the first example embodiment are indicated with same names and same reference numerals, and description on the already described elements and operations is omitted as necessary.

Figure 5:
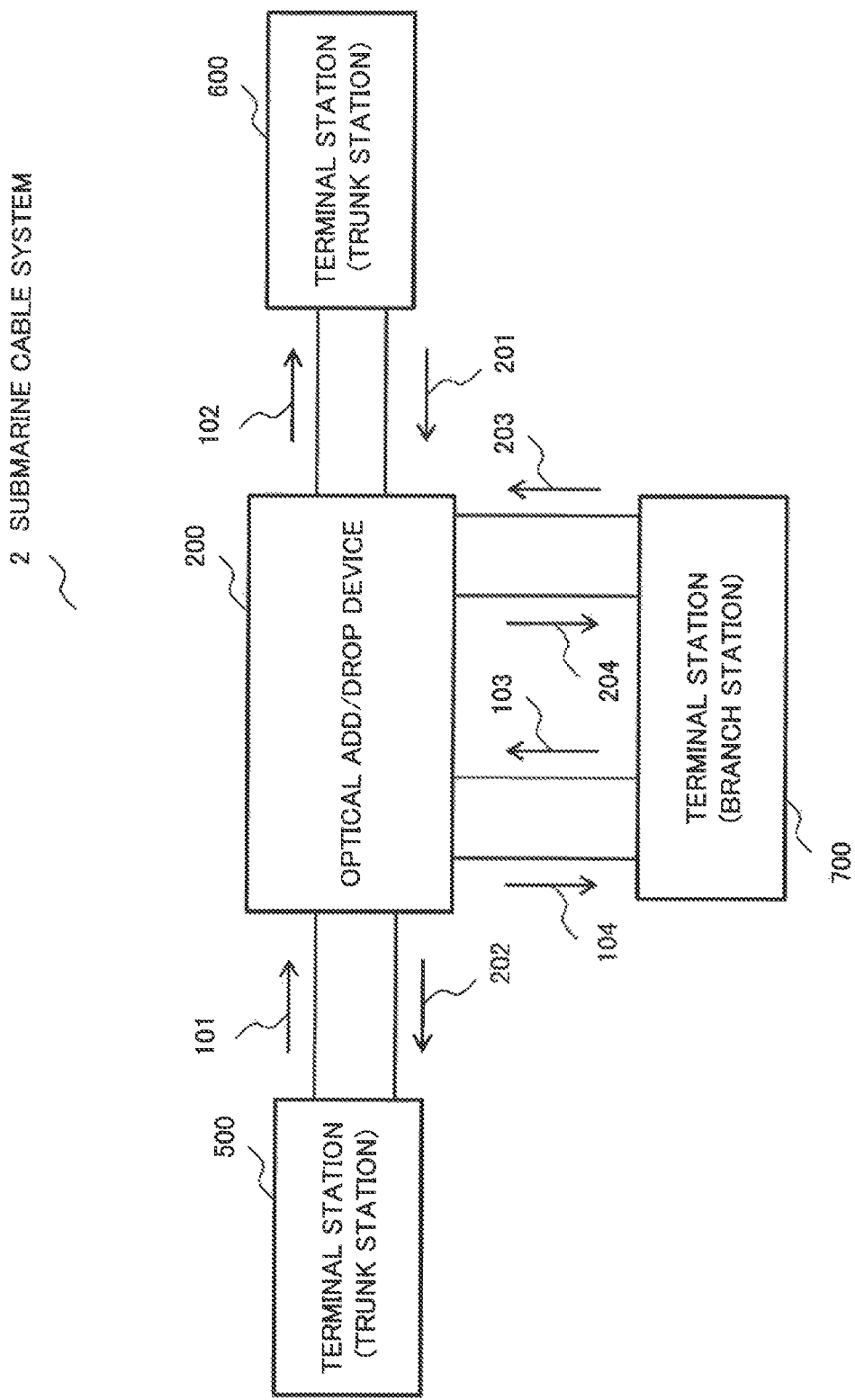
FIG. 5 is a block diagram illustrating a configuration of a submarine cable system 2.

FIG. 5 is a block diagram illustrating a configuration of the submarine cable system 2. The submarine cable system 2 includes an optical add/drop device 200, the terminal stations 500 and 600 (trunk stations), and the terminal station 700 (branch station). The optical add/drop device 200 is an ROADM device, is installed on the bottom of the sea, and is connected to the terminal stations 500, 600, and 700 by an optical submarine cable.

A trunk signal 101 is input from the terminal station 500 to the optical add/drop device 200. A trunk signal 201 is input from the terminal station 600 to the optical add/drop device 200. Branch signals 103 and 203 are input from the terminal station 700 to the optical add/drop device 200. The optical add/drop device 200 generates a trunk signal 102 and a branch signal 104, based on the trunk signal 101 and the branch signal 103. The optical add/drop device 200 generates a trunk signal 202 and a branch signal 204, based on the trunk signal 201 and the branch signal 203. The optical add/drop device 200 outputs the trunk signal 102 to the terminal station 600, outputs the trunk signal 202 to the terminal station 500, and outputs the branch signals 104 and 204 to the terminal station 700.

In the following, an optical path of the trunk signals 101 and 102 and the branch signals 103 and 104 is referred to as a downlink, and an optical path of the trunk signals 201 and 202 and the branch signals 203 and 204 is referred to as an uplink. The downlink and the uplink are independent of each other.

The trunk signal 201 is a wavelength-multiplexed signal to be transmitted by the terminal station 600, and including an optical signal of at least one wavelength band. The optical add/drop device 200 selects an optical signal of a predetermined wavelength band from the trunk signal 201 and the branch signal 203, and generates the trunk signal 202 and the branch signal 204 based on the selected optical signal. The trunk signal 202 is transmitted from the optical add/drop device 200 to the terminal station 500. The branch signal 204 is transmitted from the optical add/drop device 200 to the terminal station 700.

Figure 6:
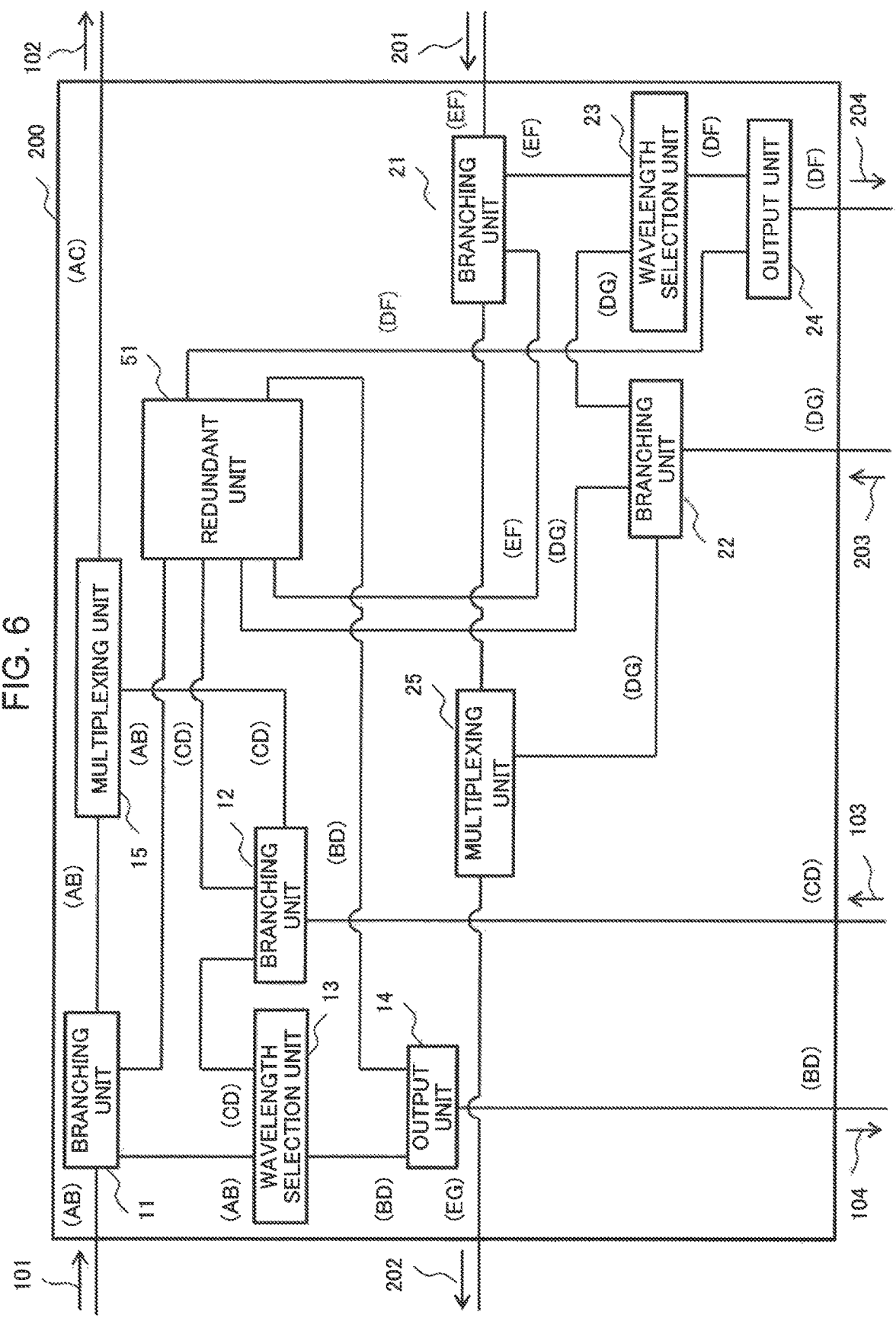
FIG. 6 is an example of a block diagram of an optical add/drop device 200.

FIG. 6 is an example of a block diagram of the optical add/drop device 200 for use in the submarine cable system 2. The optical add/drop device 200 is different from the optical add/drop device 100 in the first example embodiment in a point that the optical add/drop device 200 has a function of processing an optical signal in an uplink. The function of processing an optical signal in an uplink is the same as the function of processing an optical signal in a downlink described in the first example embodiment, except for a direction of an optical signal.

Signals E to G are optical signals to be transmitted through an uplink via the optical add/drop device 200. In the present example embodiment, the trunk signal 201 is a signal (signal EF) obtained by wavelength-multiplexing a signal E of a wavelength band E and a signal F of a wavelength band F. The branch signal 203 is a signal (signal DG) obtained by wavelength-multiplexing a signal G of a wavelength band G and a signal D of a wavelength band D.

The signal E is included in the trunk signal 201 and input to the optical add/drop device 200, and is included in the trunk signal 202 and output from the optical add/drop device 200. The signal F is input while being included in the trunk signal 201, and is output while being included in the branch signal 204. The signal G is input while being included in the branch signal 203, and is output while being included in the trunk signal 202. The signal D of the wavelength band D is a dummy signal for use in the branch signals 203 and 204 in the same manner as in a downlink. The signal D being a dummy signal in an uplink is independent of a signal D in a downlink. However, both a dummy signal in an uplink and a dummy signal in a downlink are referred to as signals D herein.

As compared with the optical add/drop device 100, the optical add/drop device 200 further includes branching units 21 and 22, a wavelength selection unit 23, an output unit 24, and a multiplexing unit 25. Further, the optical add/drop device 200 includes a redundant unit 51, in place of the redundant unit 50.

The branching unit 21 branches the trunk signal 201 (signal EF) input from the terminal station 600. The signal EF branched by the branching unit 21 is output to one of the redundant unit 51 and the wavelength selection unit 23, and to the multiplexing unit 25. The branching unit 22 branches the input branch signal 203 (signal DG). The signal DG branched by the branching unit 22 is output to one of the redundant unit 51 and the wavelength selection unit 23, and to the multiplexing unit 25.

The wavelength selection unit 23 is configured in such a way that the signal EF from the branching unit 21 and the signal DG from the branching unit 22 are input. When the signal EF and the signal DG are input, the wavelength selection unit 23 selects only signals of the wavelength bands D and F from among these signals, and generates a signal DF.

The signal DF to be output from the wavelength selection unit 23, and a signal to be output from the redundant unit 51 are input to the output unit 24. As will be described later, the redundant unit 51 outputs the signal DF to the output unit 24. The output unit 24 selects only one of the optical paths connected to the inputs of the output unit 24, and outputs a signal to be input from the selected optical path to the terminal station 700 as the branch signal 204.

The multiplexing unit 25 generates a signal EG from the signal EF input from the branching unit 21 and the signal DG input from the branching unit 22. The multiplexing unit 25 outputs the generated signal EG to the terminal station 500 as the trunk signal 202.

The redundant unit 51 monitors operations of the wavelength selection units 13 and 23, and sets a wavelength to be selected by each of the wavelength selection units 13 and 23, and a wavelength to be output from each of the wavelength selection units 13 and 23. When abnormality occurs in a wavelength selection function of one of the wavelength selection units 13 and 23, the redundant unit 51 controls the branching units 11, 12, 21, and 22, and the output units 14 and 24 in such a way that the redundant unit 51 substitutes for a function of the wavelength selection unit, in which a failure occurs. Note that a monitor function and a control function of the optical add/drop device 200 included in the redundant unit 51 may be disposed on the outside of the redundant unit 51.

Figure 7:
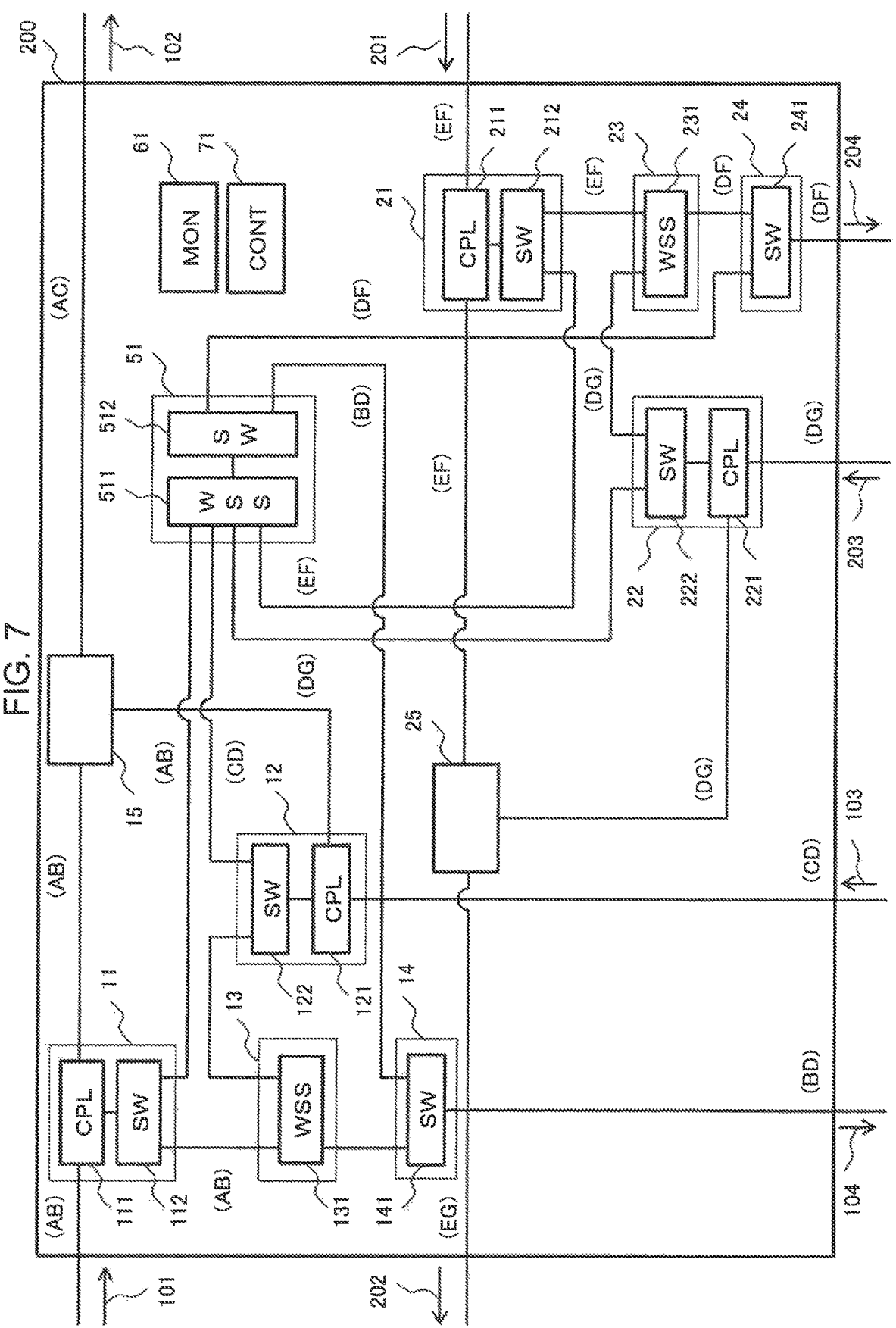
FIG. 7 is an example of a block diagram illustrating a detailed configuration of the optical add/drop device 200.

FIG. 7 is an example of a block diagram illustrating a detailed configuration of the optical add/drop device 200 described with reference to FIG. 6. A downlink is basically the same as the downlink in the optical add/drop device 100 of the first example embodiment. Therefore, in the following, different points with respect to the first example embodiment, and an uplink are described.

The branching unit 21 includes a coupler (CPL) 211 and a switch (SW) 212. The branching unit 22 includes a coupler 221 and a switch 222. The wavelength selection unit 23 includes a WSS 231 being a wavelength selection switch, and the redundant unit 51 includes a WSS 511 and a switch 512. The output unit 24 includes a switch 241. Further, FIG. 7 illustrates a monitor unit (MON) 61 having a monitor function of the optical add/drop device 200, and a control unit (CONT) 71 having a control function of the optical add/drop device 200.

Each of the couplers 211 and 221 branches input light into two components. Each of the couplers 211 and 221 is, for example, a 1×2 optical directional coupler having a branching ratio of 1:1. Each of the switches 212 and 222 is an optical switch having one input and two outputs. Input light is output to one of the outputs. The switch 212 outputs the signal EF branched by the coupler 211 to one of the wavelength selection unit 23 and the redundant unit 51. The switch 222 outputs the signal DG branched by the coupler 221 to one of the wavelength selection unit 23 and the redundant unit 51.

Each of the WSSs 231 and 511 selects an optical signal of one or more wavelengths from among input optical signals, and outputs light of the selected wavelength as a wavelength-multiplexed optical signal in the same manner as the WSSs 131 and 501. Note that unlike the WSS 501, the WSS 511 is a WSS having four inputs and one input. Wavelengths of optical signals to be generated by the WSSs 231 and 511 are controlled by the control unit 71. In the example embodiment, when the signal EF is input from the switch 212 and the signal DG is input from the switch 222, the WSS 231 generates the signal DF and outputs the signal DF to the switch 241. The switch 241 outputs a signal input from the WSS 231 or from the switch 512 as the branch signal 204.

The WSS 511 generates a signal BD from a signal AB input from the switch 112 and a signal CD input from the switch 122, and outputs the signal BD to the switch 512. Alternatively, the WSS 511 generates the signal DF from the signal EF input from the switch 212 and the signal DG input from the switch 222, and outputs the signal DF to the switch 512. Determination as to whether the WSS 511 generates the signal BD or the signal DF is set by the control unit 71.

The switch 512 is an optical switch having one input and two outputs. The switch 512 outputs a signal output from the WSS 511 to one of the switch 141 and the switch 241.

The monitor unit 61 monitors operation states of the WSSs 131, 231, and 511. When a failure of the WSS 131 or 231 is detected, the monitor unit 61 notifies the control unit 71 of the detection information as a monitoring result. The control unit 71 controls the entirety of the optical add/drop device 200 including the WSSs 131, 231, and 501, and the switches 112, 212, 122, 222, 141, 241, and 512. The control unit 71 controls a wavelength to be selected and output from each of the WSSs included in the optical add/drop device 200, and each of the switches included in the optical add/drop device 200, based on a monitoring result to be notified from the monitor unit 61.

The control unit 71 may include a CPU and a storage device. The storage device is a fixed non-transitory storage medium, and may be a non-volatile semiconductor memory, for example. The storage device, however, is not limited to the above. The CPU may implement functions of the optical add/drop device 200 by executing a program stored in the storage device.

Control of each switch and each WSS included in the optical add/drop device 200, and a propagation path of an optical signal are described. When the WSS 131 is operating properly, the control unit 71 controls the switch 141 in such a way that the signal BD to be output from the WSS 131 is output as the branch signal 104 in the same manner as the optical add/drop device 100 in the first example embodiment. The multiplexing unit 15 generates a signal AC from the signal AB output from the coupler 111 and the signal CD output from the coupler 121, and outputs the signal AC. Likewise, when the WSS 231 is operating properly, the control unit 71 controls the switch 241 in such a way that the signal DF to be output from the WSS 231 is output as the branch signal 204. The multiplexing unit 25 generates the signal EG from the signal EF output from the coupler 211 and the signal DG output from the coupler 221, and outputs the signal EG.

The WSS 511 included in the redundant unit 51 is a stand-by WSS, and is used as a substitute for one of the WSSs 131 and 231 when in one of the WSSs 131 and 231 fails in operation. Specifically, when the WSS 131 fails, the WSS 511 generates the signal BD from the signal AB output from the switch 112 and the signal CD output from the switch 122, and outputs the signal BD to the switch 512. When the WSS 231 fails, the WSS 511 generates the signal DF from the signal EF output from the switch 212 and the signal DG output from the switch 222, and outputs the signal DF to the switch 512. When the WSS 131 fails, the switch 512 outputs the signal BD to the switch 141. When the WSS 231 fails, the switch 512 outputs the signal DF to the switch 241. When both of the WSS 131 and the WSS 231 fail, the redundant unit 51 may be operated in such a way that a function of only one of the WSSs is substituted.

The switches 112 and 122 are connected to only one of the WSS 131 and the WSS 511 simultaneously. The switches 212 and 222 are connected to only one of the WSS 231 and the WSS 511 simultaneously. Specifically, both outputs of the switches 112 and 122 are connected to the WSS 131 when the WSS 131 operates properly, and are connected to the WSS 511 when the WSS 131 fails. Both outputs of the switches 212 and 222 are connected to the WSS 231 when the WSS 231 operates properly, and are connected to the WSS 511 when the WSS 231 fails.

Operation Example of Second Example Embodiment

Figure 8:
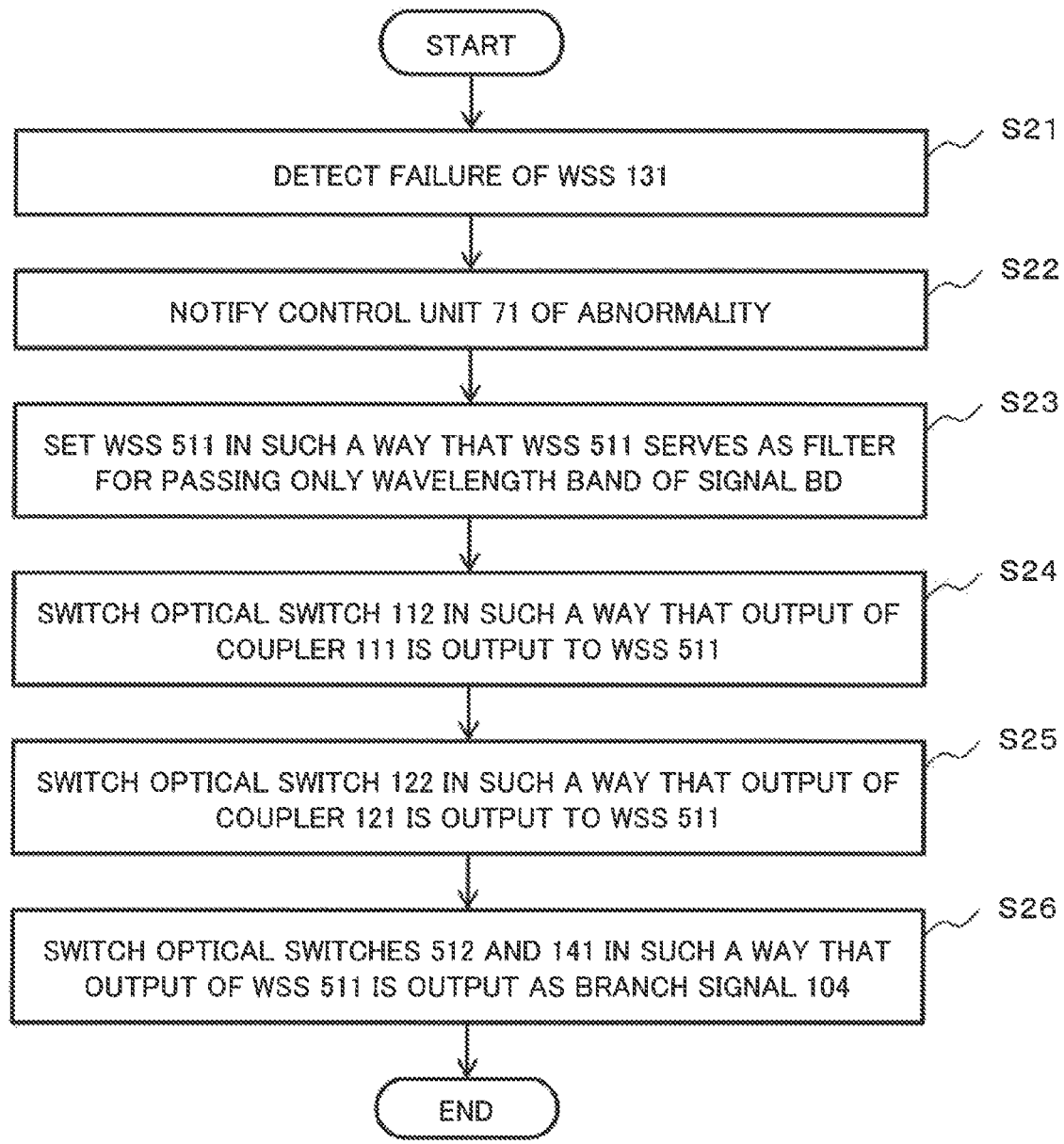
FIG. 8 is a flowchart illustrating an operation example of the optical add/drop device 200 when a failure occurs only in a WSS 131.

FIG. 8 is a flowchart illustrating an operation example of the optical add/drop device 200 when only the WSS 131 fails. When the WSS 131 fails, the WSS 511 and the switch 512 output the signal BD in place of the WSS 131.

When abnormality of the WSS 131 is detected (Step S21 in FIG. 8), the monitor unit 61 notifies the control unit 71 of the abnormality (Step S22). The control unit 71 controls each switch and the WSS 511 as follows, based on the notification from the monitor unit 61.

The control unit 71 sets the WSS 511 in such a way that the WSS 511 serves as a filter for passing only a wavelength band of the signal BD (Step S23). The control unit 71 switches the switch 112 in such a way that the signal AB output from the coupler 111 is output to the WSS 511 (Step S24). The control unit 71 switches the switch 122 in such a way that the signal CD output from the coupler 121 is output to the WSS 511 (Step S25). Since the WSS 231 is in a normal state, the switches 212 and 222 do not output the signals EF and DG to the WSS 511. Therefore, by processes of Steps S23 to S25, the signal BD is output from the WSS 511.

The control unit 71 switches the switches 512 and 141 in such a way that the signal BD input from the WSS 511 is output as the branch signal 104 (Step S26). Specifically, the switch 512 outputs the signal BD input from the WSS 511 to the switch 141. The switch 141 outputs the signal BD input from the switch 512 as the branch signal 104.

In this way, when a failure occurs in the WSS 131, the redundant unit 51 performs filtering with respect to the signal AB input from the branching unit 11 and the signal CD input from the branching unit 12, and generates the signal BD. The generated signal BD is output from the output unit 14 to the outside of the optical add/drop device 200 as the branch signal 104.

Figure 9:
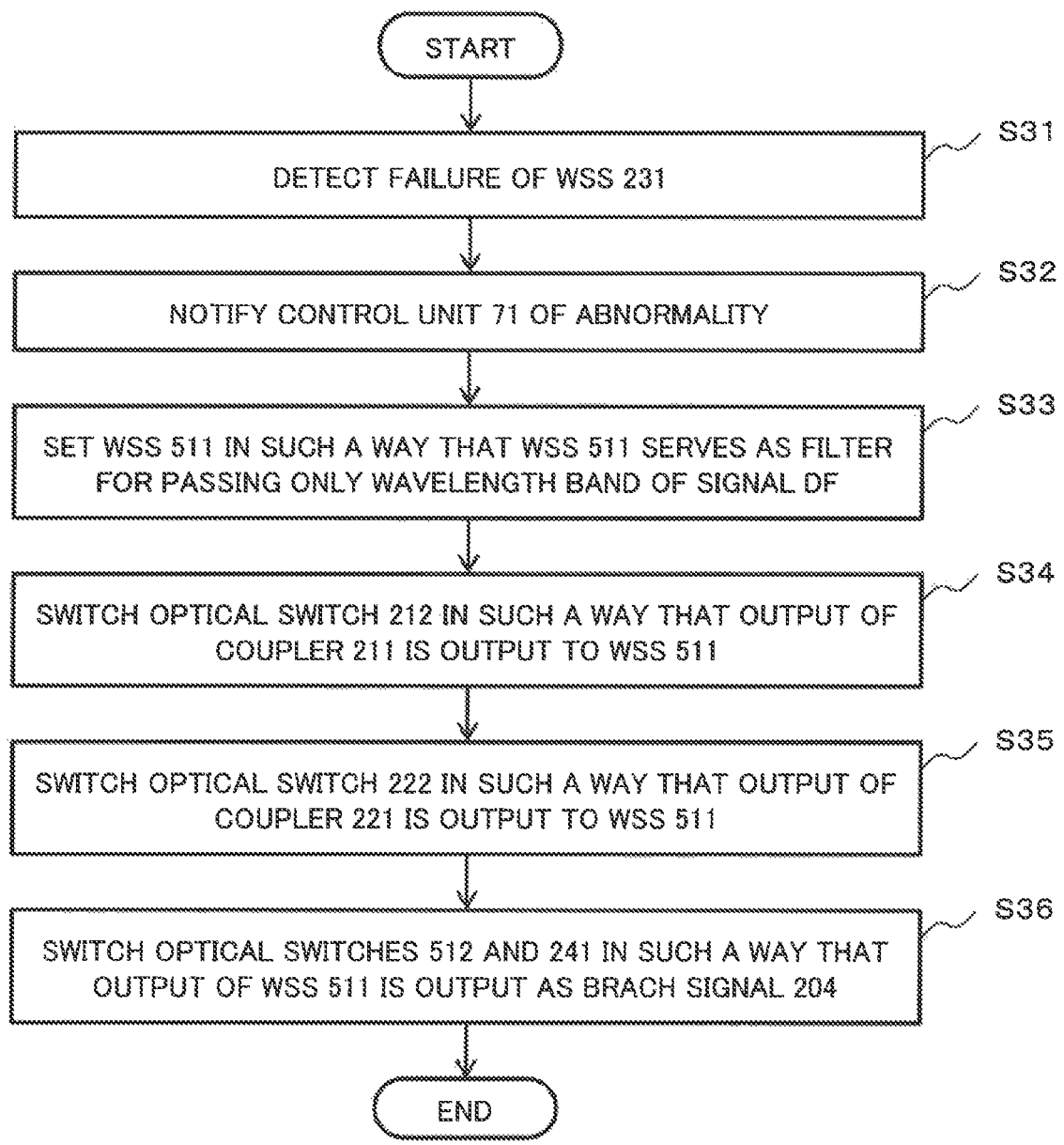
FIG. 9 is a flowchart illustrating an operation example of the optical add/drop device 200 when a failure occurs only in a WSS 231.

FIG. 9 is a flowchart illustrating an operation example of the optical add/drop device 200 when a failure occurs only in the WSS 231. Also when a failure occurs in the WSS 231 set in an uplink, the optical add/drop device 200 performs an operation equivalent to the operation performed when a failure occurs in the WSS 131. Specifically, when a failure occurs in the WSS 231, the WSS 511 and the switch 512 output the signal DF, in place of the WSS 231.

When abnormality of the WSS 231 is detected (Step S31 in FIG. 9), the monitor unit 61 notifies the control unit 71 of the abnormality (Step S32). The control unit 71 controls each switch and the WSS 511 as follows, based on the notification from the monitor unit 61.

The control unit 71 sets the WSS 511 in such a way that the WSS 511 serves as a filter for passing only a wavelength band of the signal DF (Step S33). The control unit 71 switches the switch 212 in such a way that the signal EF output from the coupler 211 is output to the WSS 511 (Step S34). The control unit 71 switches the switch 222 in such a way that the signal DG output from the coupler 221 is output to the WSS 511 (Step S35). Since the WSS 131 is operating properly, the switches 112 and 122 do not output the signals AB and CD to the WSS 511. Therefore, by processes of Steps S33 to S35, the signal DF is output from the WSS 511.

The control unit 71 switches the switches 512 and 241 in such a way that the signal DF input from the WSS 511 is output as the branch signal 204 (Step S36). Specifically, the switch 512 outputs the signal DF input from the WSS 511 to the switch 241. The switch 241 outputs the signal DF input from the switch 512 as the branch signal 204.

In this way, when the WSS 231 fails, the redundant unit 51 performs filtering with respect to the signal EF input from the branching unit 21 and the signal DG input from the branching unit 22, and generates the signal DF. The generated signal DF is output from the output unit 24 to the outside of the optical add/drop device 200 as the branch signal 204.

Description on Advantageous Effects of Second Example Embodiment

The optical add/drop device 200 in the second example embodiment is able to output a branch signal by providing the redundant unit 51 for substituting for a function of one of the WSSs 131 and 231 also when a WSS in operation fails. Specifically, the optical add/drop device 200 provides an advantageous effect that reliability of the optical add/drop device 200, and a network to which the optical add/drop device 200 is connected is enhanced. By enhancing reliability, frequency of occurrence of a failure, which makes it necessary to raise the optical add/drop device 200 when the optical add/drop device 200 is installed in the bottom of the sea, is lowered. Consequently, it is possible to suppress the repair cost of the optical add/drop device 200, and to enhance usability of a network to which the optical add/drop device 200 is connected.

Further, the WSS 511 and the switch 512 included in the redundant unit 51 are shared by an uplink and a downlink. Therefore, the optical add/drop device 200 is able to reduce the number of parts of the WSS 511 as a stand-by, as compared with a case where a redundant unit is provided individually for an uplink and a downlink.

First Modification Example of Second Example Embodiment

In the optical add/drop device 200, as described in the modification example of the first example embodiment, it is also possible to replace the switches 112 and 122, or the switch 141 with an optical coupler (e.g. a 1×2 optical directional coupler). Further, it is also possible to replace the switches 212 and 222, or the switch 241 with an optical coupler (e.g. a 1×2 optical directional coupler). A signal to be output from the WSS 511 is set by the control unit 71. Therefore, even when all the signals AB, CD, EF, and DG are input by replacement of the switches 112, 122, 212, and 222 with an optical coupler, the WSS 511 is able to output only the signal BD or the signal DF that is required.

In this way, the optical add/drop device 200 in the first modification example of the second example embodiment also provides advantageous effects that a configuration is simplified and the reliability is further enhanced by replacing an optical switch with an optical coupler.

Second Modification Example of Second Example Embodiment

In the optical add/drop device 200, it is possible to replace the switch 512 included in the redundant unit 51 with an optical coupler (e.g. a 1×2 optical directional coupler). When the switch 512 is replaced with an optical coupler, and the WSS 131 fails, for example, the signal BD is output to both of the switches 141 and 241. However, since the WSS 231 connected to the switch 241 is operating properly, the switch 241 outputs the signal DF to be output from the WSS 231 as the branch signal 204, and does not output the signal BD to be output from the redundant unit 51.

Therefore, even when the switch 512 is replaced with an optical coupler, the optical add/drop device 200 provides same advantageous effects as in the optical add/drop devices of the aforementioned example embodiments, and provides advantageous effects that a configuration is simplified and the reliability is further enhanced by replacing an optical switch with an optical coupler.

Third Example Embodiment

Figure 10:
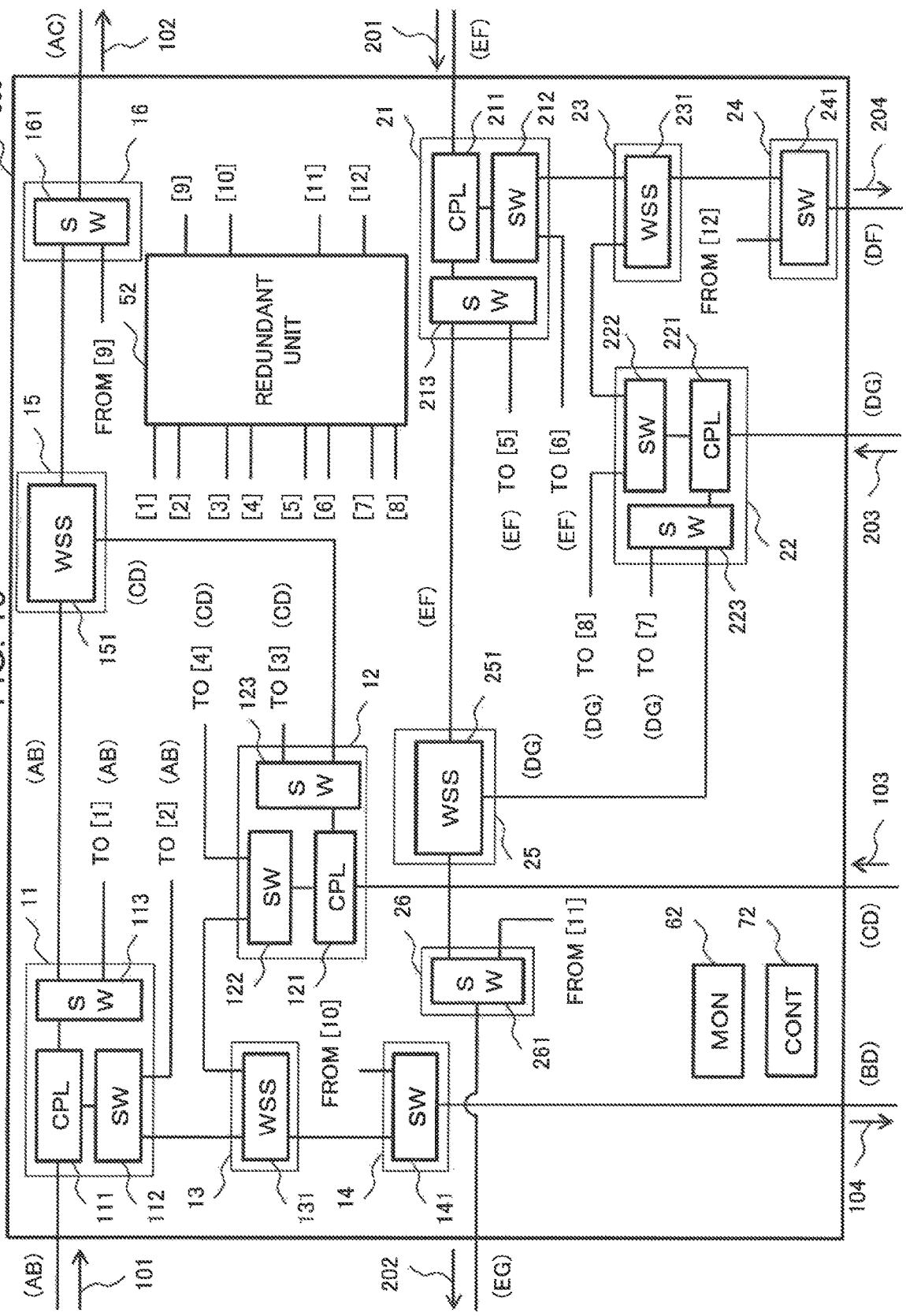
FIG. 10 is an example of a block diagram illustrating a detailed configuration of an optical add/drop device 300.

An optical add/drop device 300 in the third example embodiment of the present invention is described in the following. FIG. 10 is an example of a block diagram illustrating a detailed configuration of the optical add/drop device 300. The optical add/drop device 300 includes a redundant unit operative to handle failures of maximally four WSSs. In the third example embodiment, elements having same functions as those in the first and second example embodiments are indicated with same names and same reference numerals, and description on the already described elements is omitted as necessary.

The optical add/drop device 300 described in FIG. 10 is different from the optical add/drop device 200 in that branching units 11 and 21 respectively include switches 113 and 213. Each of multiplexing units 15 and 25 includes a WSS. Further, a redundant unit 52 is provided in place of the redundant unit 51, and output units 16 and 26 are provided.

The branching unit 11 includes the switch 113 between the coupler 111 and the multiplexing unit 15. The branching unit 21 includes the switch 213 between the coupler 211 and the multiplexing unit 25. Each of the switches 113 and 213 is an optical switch having one input and two outputs. One of the outputs of the switch 113 is connected to the multiplexing unit 15, and the other output is connected to the redundant unit 52. One of the outputs of the switch 213 is connected to the multiplexing unit 25, and the other output is connected to the redundant unit 52.

The multiplexing unit 15 includes a WSS 151. The multiplexing unit 25 includes a WSS 251. The output unit 16 includes a switch 161. The output unit 26 includes a switch 261. Each of the switches 161 and 261 is an optical switch having two inputs and one output.

As will be described later, the redundant unit 52 includes branching units 811 to 814, WSS 821 to 824, and switches 831 to 834, and 841 to 844.

When all the WSSs 131, 151, 231, and 251 are operating properly, optical paths of optical switches connected to these WSSs are controlled in such a way that outputs from these WSSs are output as a trunk signal or a branch signal. In this case, the redundant unit 52 is not used.

FIG. 10 illustrates a connection relationship between the redundant unit 52 and each switch by affixing symbols [1] to [12] to inputs or outputs of the redundant unit 52 and the switches in order to avoid that description on optical paths is made cumbersome. For example, an optical path described as "to [1]" of the switch 113 is connected to [1] of the redundant unit 52. Further, [9] of the redundant unit 52 is connected to an optical path described as "from [9]" of the switch 141.

In the following, a function of each unit of a downlink is mainly described, and description on an uplink having a same function as the function of the downlink is briefly described.

Regarding a downlink, a trunk signal 101 (signal AB) and a branch signal 103 (signal CD) are input to the optical add/drop device 300. The WSS 131 generates a branch signal 104 (signal BD) from these signals. The WSS 151 generates a trunk signal 102 (signal AC) from these signals. Regarding an uplink, a trunk signal 201 (signal EF) and a branch signal 203 (signal DG) are input to the optical add/drop device 300. The WSS 231 generates a branch signal 204 (signal DF). The WSS 251 generates a trunk signal 202 (signal EG).

A monitor unit 62 monitors a state of each WSS within the optical add/drop device 300. When a failure of one of the WSSs is detected, the monitor unit 62 notifies a control unit 72 of the detection information as a monitoring result. The monitoring result may also be notified to a ground station connected to the optical add/drop device 300. The control unit 72 controls the entirety of the optical add/drop device 300 including WSSs and optical switches. The control unit 72 controls a wavelength to be selected and output from each WSS, and a switching direction of each optical switch, based on a notification from the monitor unit 62 or from a ground station.

Figure 11:
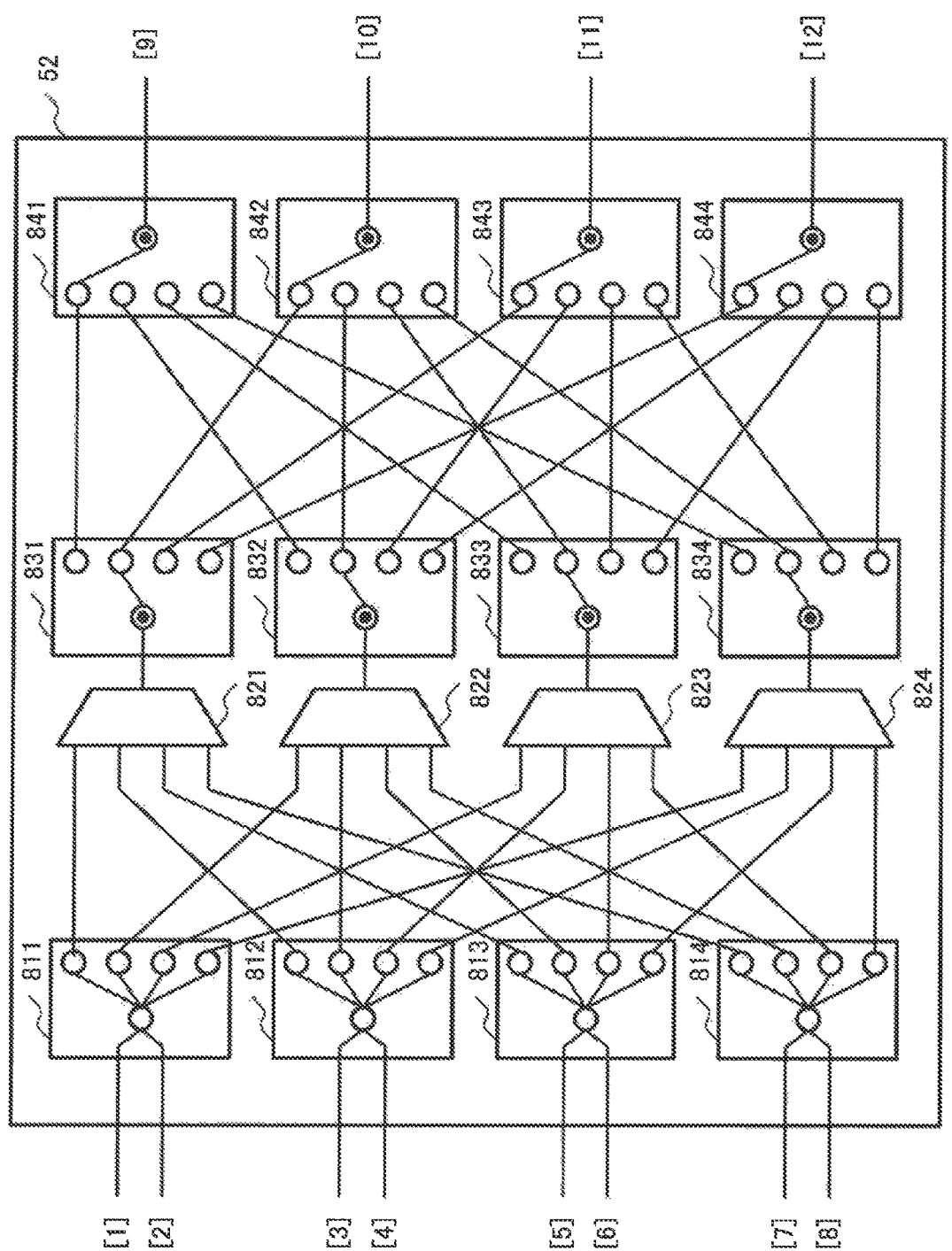
FIG. 11 is an example of a block diagram illustrating a configuration example of a redundant unit 52 included in the optical add/drop device 300.

FIG. 11 is an example of a block diagram illustrating a configuration of the redundant unit 52 included in the optical add/drop device 300. The redundant unit 52 includes the branching units 811 to 814, the WSSs 821 to 824, the optical switches 831 to 834, and the optical switches 841 to 844.

Each of the branching units 811 to 814 is an optical coupler having two ports on one side and four ports on the other side, and is a 2×4 optical star coupler, for example. Outputs of the switches 112 and 113 are connected to the 2-port side (optical paths [1] and [2]) of the branching unit 811. Outputs of the switches 122 and 123 are connected to the 2-port side (optical paths [3] and [4]) of the branching unit 812. Outputs of the switches 212 and 213 are connected to the 2-port side (optical paths [5] and [6]) of the branching unit 813. Outputs of the switches 222 and 223 are connected to the 2-port side (optical paths [7] and [8]) of the branching unit 814. The two ports (optical paths [1] and [2]) of the branching unit 811 have no difference each other in function of the redundant unit 52. Connection between outputs of the switches 112 and 113, and the optical paths [1] and [2] may be swapped. The same idea is also applied to the branching units 812 to 814.

Each of the switches 112 and 113 outputs the trunk signal 101 (signal AB) branched by the coupler 111 to one of the outputs thereof. Each of the switches 122 and 123 outputs the branch signal 103 (signal CD) branched by the coupler 121 to one of the outputs thereof. Each of the switches 212 and 213 outputs the trunk signal 201 (signal EF) branched by the coupler 211 to one of the outputs thereof. Each of the switches 222 and 223 outputs the branch signal 203 (signal DG) branched by the coupler 221 to one of the outputs thereof.

Ports on the 4-port side of each of the branching units 811 to 814 are respectively connected to the WSS 821 to 824. Therefore, it is possible to input all the signal AB, the signal CD, the signal EF, and the signal DG to the WSS 821 to 824. Each of the WSSs 821 to 824 is a wavelength selective switch, and outputs a signal selected from among input signals, based on a command from the control unit 72. Each of the WSSs 821 to 824 outputs one of the signal AC, the signal BD, the signal EG, and the signal DF, based on a command from the control unit 72. Outputs of the WSSs 821 to 824 are respectively connected to the switches 831 to 834.

Each of the switches 831 to 834 is an optical switch having one input and four outputs. Each of the switches 831 to 834 switches an optical path in such a way that an optical signal output from each of the WSSs 821 to 824 is output to one of the switches 841 to 844, based on a command from the control unit 72.

Each of the switches 841 to 844 is an optical switch having four inputs and one output. Each of the switches 841 to 844 switches an optical path in such a way that one of an optical signal input from each of the switches 831 to 834 is output to the outside of the redundant unit 52, based on a command from the control unit 72. Outputs ([9] to [12]) of the switches 841 to 844 are respectively connected to the optical switches 161, 141, 261, and 241. Note that switching directions of optical paths of the switches 831 to 834 and the switches 841 to 844 in FIG. 11 are an example, and do not limit an operation of each switch. Further, in FIG. 11, an intersection point of optical paths between the branching units 811 to 814 and the WSSs 821 to 824, and an intersection point of optical paths between the switches 831 to 834 and the switches 841 to 844 do not indicate merging points or branching points of optical paths.

Operation Example of Third Example Embodiment

An example of an operation when one of the WSSs 131, 151, 231, and 251 fails, and one of the WSSs 821, 822, 823, and 824 within the redundant unit 52 substitutes for a function of the failed WSS is described.

(1) A Case where WSS 822 Operates in Place of WSS 131

Figure 12:
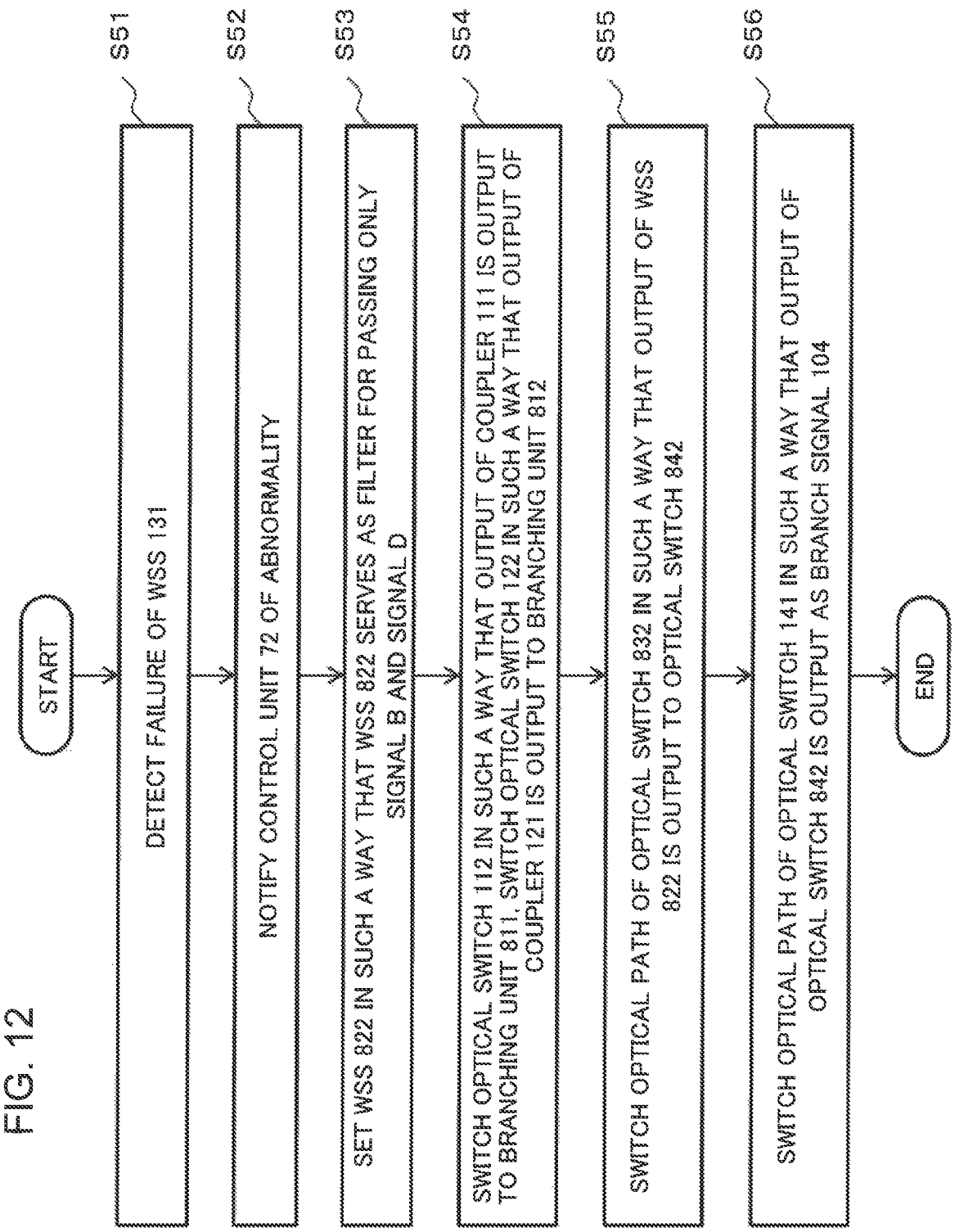
FIG. 12 is a flowchart illustrating an operation example of the optical add/drop device 300 when a failure occurs in a WSS 131.

FIG. 12 is a flowchart illustrating an operation example of the optical add/drop device 300 when a failure occurs in the WSS 131. When abnormality of the WSS 131 is detected (Step S51 in FIG. 12), the monitor unit 62 notifies the control unit 72 of the abnormality (Step S52). The control unit 72 performs the following control.

The control unit 72 sets the WSS 822 in such a way that the WSS 822 serves as a filter for passing only a signal B and a signal D (Step S53). Further, the control unit 72 switches the optical switch 112 in such a way that an output of the coupler 111 is output to the branching unit 811, and switches the optical switch 122 in such a way that an output of the coupler 121 is output to the branching unit 812 (Step S54). Consequently, the signal AB is input from the branching unit 811 to the WSS 822, and the signal CD is input from the branching unit 812 to the WSS 822. Further, the WSS 822 outputs the signal BD to the optical switch 832.

The control unit 72 switches an optical path of the optical switch 832 in such a way that an output of the WSS 822 is output to the optical switch 842 (Step S55). Consequently, the signal BD output from the WSS 822 is output to the optical switch 141 via the optical switch 842 and the optical path [10].

The control unit 72 switches an optical path of the optical switch 141 in such a way that the signal BD to be output from the optical switch 842 is output as the branch signal 104 (Step S56).

By the aforementioned processes, the signal AB to be output from the branching unit 811 and the signal CD to be output from the branching unit 812 are subjected to filtering by the WSS 822. Further, the signal BD generated by the WSS 822 is output to the outside of the optical add/drop device 300 via the optical switches 832, 842, and 141 as the branch signal 104. Consequently, the optical add/drop device 300 is able to output the branch signal 104 even when a failure occurs in the WSS 131.

(2) A Case where WSS 821 Operates in Place of WSS 151

Figure 13:
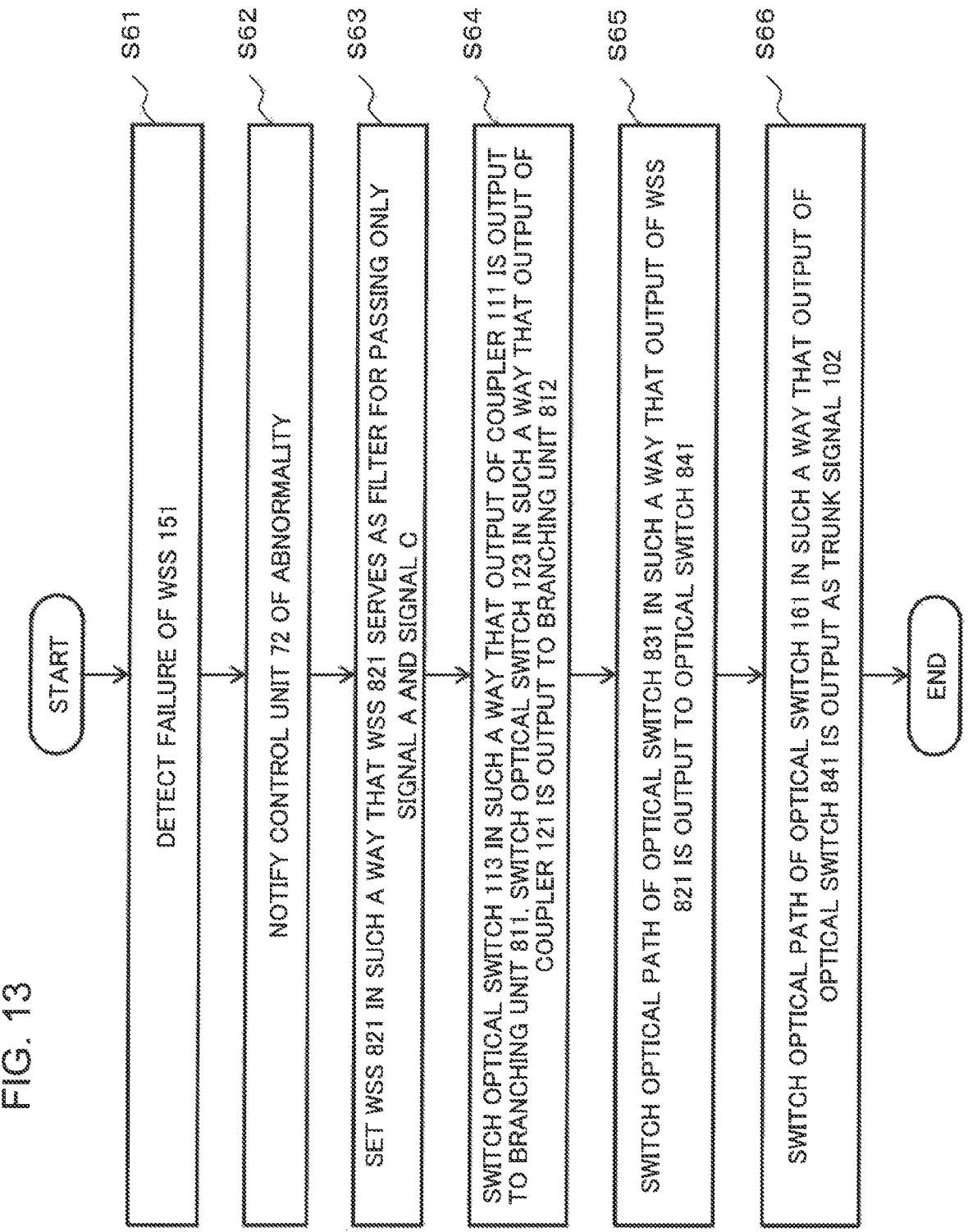
FIG. 13 is a flowchart illustrating an operation example of the optical add/drop device 300 when a failure occurs in a WSS 151.

FIG. 13 is a flowchart illustrating an operation example of the optical add/drop device 300 when a failure occurs in the WSS 151. When abnormality of the WSS 151 is detected (Step S61 in FIG. 13), the monitor unit 62 notifies the control unit 72 of the abnormality (Step S62). The control unit 72 performs the following control.

The control unit 72 sets the WSS 821 in such a way that the WSS 821 serves as a filter for passing only a signal A and a signal C (Step S63). Further, the control unit 72 switches the optical switch 113 in such a way that an output of the coupler 111 is output to the branching unit 811, and switches the optical switch 123 in such a way that an output of the coupler 121 is output to the branching unit 812 (Step S64). Consequently, the signal AB is input from the branching unit 811 to the WSS 821, and the signal CD is input from the branching unit 812 to the WSS 821. Further, the WSS 821 outputs the signal AC to the optical switch 831.

The control unit 72 switches an optical path of the optical switch 831 in such a way that an output of the WSS 821 is output to the optical switch 841 (Step S65). Consequently, the signal AC output from the WSS 821 is output to the optical switch 161 via the optical switch 841 and the optical path [9].

The control unit 72 switches an optical path of the optical switch 161 in such a way that the signal AC to be output from the optical switch 841 is output as the trunk signal 102 (Step S66).

By the aforementioned processes, the signal AB to be output from the branching unit 811 and the signal CD to be output from the branching unit 812 are subjected to filtering by the WSS 821. The signal AC generated by the WSS 821 is output to the outside of the optical add/drop device 300 via the optical switches 831, 841, and 161 as the trunk signal 102. Consequently, the optical add/drop device 300 is able to output the trunk signal 102 even when a failure occurs in the WSS 151.

In the foregoing, an operation of the redundant unit 52 when a failure occurs in the WSS 131 or in the WSS 151 disposed in a downlink is described. Likewise, the redundant unit 52 is able to output the trunk signal 202 (signal EG) or the branch signal 204 (signal DF) even when a failure occurs in the WSS 231 or in the WSS 251 disposed in an uplink. Since an operation process when a failure occurs in a WSS set in an uplink is basically the same as in a downlink transmission path, description on an operation of the redundant unit 52 regarding an uplink transmission path is omitted.

When the WSS 131 described in the flow of FIG. 12 fails, a function of the WSS 131 is substituted by only the branching units 811 and 812, the WSS 822, and the optical switches 832 and 842 within the redundant unit 52. Specifically, when the WSS 131 fails, WSSs and optical switches other than the above included in the redundant unit 52 are not used. Further, the branching units 811 to 814 distribute input signals among the WSSs 821 to 824. Therefore, even when a part or all of the WSSs 151, 231, and 251 fails in addition to the WSS 131, the redundant unit 52 is able to output the signal AC, the signal BD, the signal EG, and the signal DF, which are required to be generated by using the remaining WSSs and optical switches included in the redundant unit 52.

Specifically, the optical add/drop device 300 in the third example embodiment is able to maintain an optical add/drop function by allowing the WSSs 821 to 824 included in the redundant unit 52 to substitute for a function of a part or all of the WSSs 131, 151, 231, and 251 even when a part or all of the WSSs 131, 151, 231, and 251 fail.

Further, since outputs of the branching units 811 to 814 are distributed among all the WSSs 821 to 824, it is possible to substitute for functions of the WSS 821 and the switch 831 by the WSS 822 and the switch 832, the WSS 823 and the switch 833, or the WSS 824 and the switch 834, for example. For example, when a failure occurs in the WSS 821 or switch 831, it is possible to use the WSS 822 and the switch 832.

FIG. 14 is a flowchart illustrating an example of a process of allowing the WSS 823 to substitute for a function of the WSS 131 when a failure occurs in the WSS 131. When abnormality of the WSS 131 is detected (Step S71 in FIG. 14), the monitor unit 62 notifies the control unit 72 of the abnormality (Step S72). The control unit 72 performs the following control.

The control unit 72 sets the WSS 823 in such a way that the WSS 823 serves as a filter for passing only a signal B and a signal D (Step S73). Further, the control unit 72 switches the optical switch 112 in such a way that an output of the coupler 111 is output to the branching unit 811, and switches the optical switch 122 in such a way that an output of the coupler 121 is output to the branching unit 812 (Step S74). Consequently, the signal AB is input from the branching unit 811 to the WSS 823, and the signal CD is input from the branching unit 812 to the WSS 823. Further, the WSS 823 outputs the signal BD to the optical switch 833.

The control unit 72 switches an optical path of the optical switch 833 in such a way that an output of the WSS 823 is output to the optical switch 842 (Step S75). Consequently, the signal BD output from the WSS 823 is output to the optical switch 141 via the optical switch 842 and the optical path [10].

The control unit 72 switches an optical path of the optical switch 141 in such a way that the signal BD to be output from the optical switch 842 is output as the branch signal 104 (Step S76). By the aforementioned processes, the signal AB to be output from the branching unit 811 and the signal CD to be output from the branching unit 812 are subjected to filtering by the WSS 823, and the signal BD is output to the outside of the optical add/drop device 300 via the optical switches 833, 842, and 141 as the branch signal 104.

In this way, the optical switches 833 and 842 switch an optical path in such a way that an output of the WSS 823 is output from the redundant unit 52 via the optical switch 842. Consequently, the WSS 823 is also able to substitute for a function of the WSS 131 in the same manner as the WSS 822. Further, also when a failure occurs in the WSSs 151, 231, and 251, it is possible to substitute for a function of the failed WSS by using a WSS which is not used among the WSSs 821 to 824.

The optical add/drop device 300 in the third example embodiment provides an advantageous effect that reliability of the optical add/drop device and a network to which the optical add/drop device is connected is enhanced in the same manner as in the first and second example embodiments by providing the redundant unit 52 for substituting for a function of a WSS.

Further, the optical add/drop device 300 in the third example embodiment provides an advantageous effect that it is possible to further enhance reliability of the optical add/drop device. The first reason for this is that providing a plurality of WSSs in the redundant unit 52 makes it possible to substitute for functions of the WSSs when some of the plurality of WSSs in operation fail. The second reason for this is that providing a plurality of WSSs in the redundant unit 52 makes it possible to implement a redundant function by using another WSS included in the redundant unit 52 even when a part of the WSSs included in the redundant unit 52 fails.

Modification Example of Third Example Embodiment

In the redundant unit 52 of the present example embodiment, it is possible to replace each of the switches 831 to 834 with an optical coupler having one input and four outputs (e.g. 1×4 optical star coupler). Replacing each of the switches 831 to 834 with an optical coupler makes it possible to distribute optical signals to be output from the WSSs 821 to 824 among the switches 841 to 844. However, each of the optical switches 841 to 844 selects only one of signal beams input from the couplers 831 to 834, and outputs the selected signal beam to the outside of the redundant unit 52. Therefore, even when each of the optical switches 831 to 834 is replaced with an optical coupler, a signal beam generated by one of the WSSs 821 to 824 is supplied only to an optical path associated with a failed WSS.

The optical add/drop device 300 having such a configuration provides advantageous effects that a configuration is simplified and the reliability is further enhanced. The reason for this is that by replacing an optical switch with an optical coupler, an optical switch and control thereof are not required.

The example embodiments of the present invention may also be described as the following supplementary notes, but are not limited to the supplementary notes.

(Supplementary Note 1)

An optical add/drop device including:

first wavelength selection means and second wavelength selection means capable of selecting and outputting an optical signal of a predetermined wavelength from an input optical signal;

first branching means for selectively outputting a first signal being an optical signal input from a first terminal station on a main route to the first wavelength selection means and the second wavelength selection means;

second branching means for selectively outputting a second signal being an optical signal input from a second terminal station on a sub-route to the first wavelength selection means and the second wavelength selection means; and first output means capable of selectively outputting, to the second terminal station, one of an optical signal to be output from the first wavelength selection means based on the first signal and the second signal, and an optical signal to be output from the second wavelength selection means based on the first signal and the second signal as a third signal.

(Supplementary Note 2)

The optical add/drop device according to supplementary note 1, wherein the first branching means selectively outputs the first signal as a fourth signal or a fifth signal, the second branching means selectively outputs the second signal as a sixth signal or a seventh signal, when the fourth signal and the sixth signal are input, the first wavelength selection means selects a signal of a predetermined wavelength from the fourth signal and the sixth signal, and generates and outputs an eighth signal, when the fifth signal and the seventh signal are input, the second wavelength selection means selects a signal of a predetermined wavelength from the fifth signal and the seventh signal, and generates and outputs a ninth signal, and the first output means selectively outputs one of the eighth signal and the ninth signal as the third signal.

(Supplementary Note 3)

The optical add/drop device according to supplementary note 1 or 2, wherein the first wavelength selection means and the second wavelength selection means respectively include a wavelength selective switch (WSS).

(Supplementary Note 4)

The optical add/drop device according to any one of supplementary notes 1 to 3, further including:

monitor means for outputting a notification indicating a failure when the failure of the first wavelength selection means is detected; and control means for controlling the first branching means, the second branching means, the second wavelength selection means, and the first output means in such a way that an optical signal to be output from the second wavelength selection means is output as the third signal when the notification indicating the failure is received from the monitor means.

(Supplementary Note 5)

The optical add/drop device according to any one of supplementary notes 1 to 4, further including:

multiplexing means for generating a tenth signal based on the first signal and the second signal, and transmitting the tenth signal to a third terminal station on the main route.

(Supplementary Note 6)

The optical add/drop device according to supplementary note 2, further including:

third branching means for selectively outputting an eleventh signal being an optical signal output from a third terminal station on the main route to the first wavelength selection means and the second wavelength selection means; and fourth branching means for selectively outputting a twelfth signal being an optical signal output from the second terminal station to the first wavelength selection means and the second wavelength selection means, wherein the optical add/drop device includes second output means capable of selectively outputting, to the second terminal station, one of an optical signal to be output from the first wavelength selection means based on the eleventh signal and the twelfth signal, and an optical signal to be output from the second wavelength selection means based on the eleventh signal and the twelfth signal as a thirteenth signal.

(Supplementary Note 7)

The optical add/drop device according to supplementary note 6, wherein the third branching means selectively outputs the eleventh signal as a fourteenth signal or a fifteenth signal, the fourth branching means selectively outputs the twelfth signal as a sixteenth signal or a seventeenth signal, the first wavelength selection means selects a signal of a predetermined wavelength from the fourteenth signal and the sixteenth signal, and generates and outputs an eighteenth signal when the fourteenth signal and the sixteenth signal are further input, the second wavelength selection means selects a signal of a predetermined wavelength from the fifteenth signal and the seventeenth signal, and generates and outputs a nineteenth signal when the fifteenth signal and the seventeenth signal are further input, and the second output means selectively outputs one of the eighteenth signal and the nineteenth signal as the thirteenth signal.

(Supplementary Note 8)

The optical add/drop device according to supplementary note 7, wherein the first wavelength selection means includes a wavelength selective switch (WSS), and the second wavelength selection means includes a WSS for generating the ninth signal when the fifth signal and the seventh signal are input, and generating the nineteenth signal when the fifteenth signal and the seventeenth signal are input, and an optical switch for outputting the ninth signal generated in the WSS to the first output means, and outputting the nineteenth signal generated in the WSS to the second output means.

(Supplementary Note 9)

The optical add/drop device according to any one of supplementary notes 6 to 8, further including:

monitor means for outputting, when a first failure of the first wavelength selection means relating to processing of the first signal and the second signal, or a second failure of the first wavelength selection means relating to processing of the eleventh signal and the twelfth signal is detected, a notification indicating the first failure or the second failure; and control means for controlling the first branching means, the second branching means, the second wavelength selection means, and the first output means in such a way that an optical signal to be output from the second wavelength selection means based on the first signal and the second signal is output as the third signal when the first failure is notified, and controlling the third branching means, the fourth branching means, the second wavelength selection means, and the second output means in such a way that an optical signal to be output from the second wavelength selection means based on the eleventh signal and the twelfth signal is output as the thirteenth signal when the second failure is notified.

(Supplementary Note 10)

The optical add/drop device according to supplementary note 6 or 7, further including:

multiplexing means for generating a tenth signal based on the first signal and the second signal, and transmitting the tenth signal to a third terminal station on the main route, while generating a twentieth signal based on the eleventh signal and the twelfth signal, and transmitting the twentieth signal to the first terminal station.

(Supplementary Note 11)

The optical add/drop device according to supplementary note 10, further including:

third output means capable of selectively outputting, to the third terminal station, one of the tenth signal to be output from the multiplexing means, and an optical signal to be output from the second wavelength selection means based on the first signal and the second signal; and fourth output means capable of selectively outputting, to the first terminal station, one of the twentieth signal to be output from the multiplexing means, and an optical signal to be output from the second wavelength selection means based on the eleventh signal and the twelfth signal, wherein the second wavelength selection means is configured to input a first signal branched by the first branching means, a second signal branched by the second branching means, the eleventh signal branched by the third branching means, and the twelfth signal branched by the second branching mean, and to output an optical signal generated based on operation states of the first wavelength selection means and the multiplexing means to one of the first to fourth output means.

(Supplementary Note 12)

The optical add/drop device according to supplementary note 11, further including:

monitor means for outputting, when a first failure of the first wavelength selection means relating to processing of the first signal and the second signal, a second failure of the multiplexing means relating to processing of the first signal and the second signal, a third failure of the first wavelength selection means relating to processing of the eleventh signal and the twelfth signal, or a fourth failure of the multiplexing means relating to processing of the eleventh signal or the twelfth signal is detected, a notification indicating the detected failure; and control means for controlling the first branching means, the second branching means, the second wavelength selection means, and the first output means in such a way that an optical signal to be output from the second wavelength selection means based on the first signal and the second signal is output as the third signal when the first failure is notified, controlling the first branching means, the second branching means, the second wavelength selection means, and the third output means in such a way that an optical signal to be output from the second wavelength selection means based on the first signal and the second signal is output as the tenth signal when the second failure is notified, controlling the third branching means, the fourth branching means, the second wavelength selection means, and the second output means in such a way that an optical signal to be output from the second wavelength selection means based on the eleventh signal and the twelfth signal is output as the thirteenth signal when the third failure is notified, and controlling the third branching means, the fourth branching means, the second wavelength selection means, and the fourth output means in such a way that an optical signal to be output from the second wavelength selection means based on the eleventh signal and the twelfth signal is output as the twentieth signal when the fourth failure is notified.

(Supplementary Note 13)

An optical communication system including:

a first terminal station on a main route and configured to transmit a first signal;

a second terminal station on a sub-route and configured to transmit a second signal and receive a third signal; and the optical add/drop device according to any one of supplementary notes 1 to 12 to which the first terminal station and the second terminal station are connected.

(Supplementary Note 14)

An optical add/drop method including:

selecting and outputting an optical signal of a predetermined wavelength from an input optical signal by a first wavelength selection means;

selecting and outputting an optical signal of a predetermined wavelength from an input optical signal by a second wavelength selection means;

selectively outputting a first signal being an optical signal input from a first terminal station on a main route to the first wavelength selection means and the second wavelength selection means;

selectively outputting a second signal being an optical signal input from a second terminal station on a sub-route to the first wavelength selection means and the second wavelength selection means; and selectively outputting, to the second terminal station, one of an optical signal to be output from the first wavelength selection means based on the first signal and the second signal, and an optical signal to be output from the second wavelength selection means based on the first signal and the second signal as a third signal.

(Supplementary Note 15)

A program for causing a computer of an optical add/drop device to execute:

a step of selecting and outputting an optical signal of a predetermined wavelength from an input optical signal by using a first wavelength selection means;

a step of selecting and outputting an optical signal of a predetermined wavelength from an input optical signal by using a second wavelength selection means;

a step of selectively outputting a first signal being an optical signal input from a first terminal station on a main route to the first wavelength selection means and the second wavelength selection means;

a step of selectively outputting a second signal being an optical signal input from a second terminal station on a sub-route to the first wavelength selection means and the second wavelength selection means; and a step of selectively outputting, to the second terminal station, one of an optical signal to be output from the first wavelength selection means based on the first signal and the second signal, and an optical signal to be output from the second wavelength selection means based on the first signal and the second signal as a third signal.

In the foregoing, the invention of the present application is described by referring to the example embodiments. The invention of the present application, however, is not limited to the example embodiments. A configuration and details of the invention of the present application may be modified in various ways comprehensible to a person skilled in the art within the scope of the invention of the present application. This application claims the priority based on Japanese Patent Application No. 2015-153538 filed on Aug. 3, 2015, the disclosure of which is incorporated herein in its entirety.

REFERENCE SIGNS LIST 100, 200, 300 Optical add/drop device
900 ROADM device
11, 12, 21, 22, 811 to 814 Branching unit
13, 23 Wavelength selection unit
14, 16, 24, 26 Output unit
15, 25 Multiplexing unit
50 to 52 Redundant unit
60, 61, 62 Monitor unit
70, 71, 72 Control unit
101, 102, 201, 202 Trunk signal
103, 104, 203, 204 Branch signal
131, 151, 231, 251, 501, 511, 821 to 824 WSS
112, 113, 122, 123, 141, 161 Switch
212, 213, 222, 223, 241, 261 Switch
831 to 834, 841 to 844 Switch
500, 600, 700 Terminal station

The invention claimed is:

1. An optical add/drop device comprising:
a first wavelength selector, a second wavelength selector and a third wavelength selector, each configured to select and output an optical signal of a predetermined wavelength from an input optical signal;
a first branching circuit configured to selectively output a first signal being an optical signal input from a first terminal station on a main route to the first wavelength selector or the second wavelength selector;
a second branching circuit configured to selectively output a second signal being an optical signal input from a second terminal station on a sub-route to the first wavelength selector or the second wavelength selector;
a first output circuit configured to selectively output, to the second terminal station, one of an optical signal to be output from the first wavelength selector, based on the first signal and the second signal, and an optical signal to be output from the second wavelength selector, based on the first signal and the second signal, as a third signal;
a third branching circuit configured to selectively output a fourth signal being an optical signal input from a third terminal station on the main route, to the second wavelength selector or the third wavelength selector; and
a fourth branching circuit configured to selectively output a fifth signal being an optical signal input from the second terminal station, to the second wavelength selector or the third wavelength selector,
wherein the optical add/drop device includes a second output circuit configured to selectively output, to the second terminal station, one of an optical signal to be output from the second wavelength selector, based on the fourth signal and the fifth signal, and an optical signal to be output from the third wavelength selector, based on the fourth signal and the fifth signal, as a sixth signal.

2. The optical add/drop device according to claim 1, wherein
the first branching circuit selectively outputs the first signal as a seventh signal or a eighth signal,
the second branching circuit selectively outputs the second signal as a ninth signal or a tenth signal,
when the seventh signal and the ninth signal are input, the first wavelength selector selects a signal of a predetermined wavelength from the seventh signal and the ninth signal, and generates and outputs an eleventh signal,
when the eighth signal and the tenth signal are input, the second wavelength selector selects a signal of a predetermined wavelength from the eighth signal and the tenth signal, and generates and outputs a twelfth signal, and
the first output circuit selectively outputs one of the eleventh signal and the twelfth signal, as the third signal.

3. The optical add/drop device according to claim 1, wherein
the first wavelength selector and the second wavelength selector respectively include a wavelength selective switch (WSS).

4. The optical add/drop device according to claim 1, further comprising:
a monitor configured to output a notification indicating a failure when detecting the failure of the first wavelength selection selector; and
a controller configured to control the first branching circuit, the second branching circuit, the second wavelength selector, and the first output circuit in such a way that an optical signal to be output from the second wavelength selector is output as the third signal when receiving the notification indicating the failure from the monitor.

5. The optical add/drop device according to claim 1, wherein the third branching circuit selectively outputs the fourth signal as a thirteenth signal or a fourteenth signal,
the fourth branching circuit selectively outputs the fifth signal as a fifteenth signal or a sixteenth signal,
the first wavelength selector selects a signal of a predetermined wavelength from the thirteenth signal and the fifteenth signal, and generates and outputs an seventeenth signal, when the thirteenth signal and the fifteenth signal are further input,
the second wavelength selector selects a signal of a predetermined wavelength from the fourteenth signal and the sixteenth signal, and generates and outputs a eighteenth signal, when the fourteenth signal and the sixteenth signal are further input, and
the second output circuit selectively outputs one of the seventeenth signal and the eighteenth signal as the thirteenth signal.

6. The optical add/drop device according to claim 5, wherein
the first wavelength selector includes a wavelength selective switch (WSS), and
the second wavelength selector includes
a WSS for generating the twelfth signal when the eighth signal and the tenth signal are input, and generating the eighteenth signal when the fourteenth signal and the sixteenth signal are input, and
an optical switch for outputting the ninth signal generated in the WSS to the first output circuit, and outputting the eighteenth signal generated in the WSS to the second output circuit.

7. The optical add/drop device according to claim 5, further comprising:
a monitor configured to output, when detecting a first failure of the first wavelength selector relating to processing of the first signal and the second signal, or a second failure of the first wavelength selector relating to processing of the fourth signal and the fifth signal, a notification indicating the first failure or the second failure; and a controller configured to control the first branching circuit, the second branching circuit, the second wavelength selector, and the first output circuit in such a way that an optical signal to be output from the second wavelength selector, based on the first signal and the second signal, is output as the third signal when the first failure is notified, and controlling the third branching circuit, the fourth branching circuit, the second wavelength selector, and the second output circuit in such a way that an optical signal to be output from the second wavelength selector, based on the fourth signal and the fifth signal, is output as the sixth signal when the second failure is notified.

8. The optical add/drop device according to claim 5, further comprising:

a multiplexer configured to generate a nineteenth signal, based on the first signal and the second signal, and transmit the nineteenth signal to a third terminal station on the main route, and, while generating a twentieth signal, based on the fourth signal and the fifth signal, and transmit the twentieth signal to the first terminal station.

9. The optical add/drop device according to claim 2, wherein the first wavelength selector and the second wavelength selector respectively include a wavelength selective switch (WSS).

10. The optical add/drop device according to claim 2, further comprising:

a monitor configured to output a notification indicating a failure when detecting the failure of the first wavelength selection selector; and a controller configured to control the first branching circuit, the second branching circuit, the second wavelength selector, and the first output circuit in such a way that an optical signal to be output from the second wavelength selector is output as the third signal when receiving the notification indicating the failure from the monitor.

11. The optical add/drop device according to claim 3, further comprising:

a monitor configured to output a notification indicating a failure when detecting the failure of the first wavelength selection selector; and a controller configured to control the first branching circuit, the second branching circuit, the second wavelength selector, and the first output circuit in such a way that an optical signal to be output from the second wavelength selector is output as the third signal when receiving the notification indicating the failure from the monitor.

12. The optical add/drop device according to claim 6, further comprising:

a monitor configured to output, when detecting a first failure of the first wavelength selector relating to processing of the first signal and the second signal, or a second failure of the first wavelength selector relating to processing of the fourth signal and the fifth signal, a notification indicating the first failure or the second failure; and a controller configured to control the first branching circuit, the second branching circuit, the second wavelength selector, and the first output circuit in such a way that an optical signal to be output from the second wavelength selector, based on the first signal and the second signal, is output as the third signal when the first failure is notified, and controlling the third branching circuit, the fourth branching circuit, the second wavelength selector, and the second output circuit in such a way that an optical signal to be output from the second wavelength selector, based on the fourth signal and the fifth signal, is output as the sixth signal when the second failure is notified.

13. The optical add/drop device according to claim 6, further comprising:

a multiplexer configured to generate a nineteenth signal, based on the first signal and the second signal, and transmit the nineteenth signal to a third terminal station on the main route, and, while generating a twentieth signal, based on the fourth signal and the fifth signal, and transmit the twentieth signal to the first terminal station.

14. An optical add/drop method comprising:

selecting and outputting an optical signal of a predetermined wavelength from an input optical signal by a first wavelength selector;

selecting and outputting an optical signal of a predetermined wavelength from an input optical signal by a second wavelength selector;

selectively outputting a first signal being an optical signal input from a first terminal station on a main route, to the first wavelength selector and the second wavelength selector;

selectively outputting a second signal being an optical signal input from a second terminal station on a sub-route, to the first wavelength selector and the second wavelength selector; and selectively outputting, to the second terminal station, one of an optical signal to be output from the first wavelength selector, based on the first signal and the second signal, and an optical signal to be output from the second wavelength selector, based on the first signal and the second signal, as a third signal;

selectively outputting a fourth signal being an optical signal input from a third terminal station on the main route, to the second wavelength selector or a third wavelength selector;

selectively outputting a fifth signal being an optical signal input from the second terminal station, to the second wavelength selector or the third wavelength selector; and selectively outputting, to the second terminal station, one of an optical signal to be output from the second wavelength selector, based on the fourth signal and the fifth signal, and an optical signal to be output from the third wavelength selector, based on the fourth signal and the fifth signal, as a sixth signal.

* * * * *